US009628215B2

(12) United States Patent
Tan et al.

(10) Patent No.: US 9,628,215 B2
(45) Date of Patent: Apr. 18, 2017

(54) CELL-SPECIFIC REFERENCE SIGNAL INTERFERENCE CANCELLATION IMPROVEMENT

(71) Applicant: Nokia Solutions and Networks Oy, Espoo (FI)

(72) Inventors: Jun Tan, Lake Zurich, IL (US); Weidong Yang, Hoffman Estates, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 34 days.

(21) Appl. No.: 14/418,318

(22) PCT Filed: Aug. 1, 2013

(86) PCT No.: PCT/EP2013/066182
§ 371 (c)(1),
(2) Date: Jan. 29, 2015

(87) PCT Pub. No.: WO2014/020110
PCT Pub. Date: Feb. 6, 2014

(65) Prior Publication Data
US 2015/0195057 A1 Jul. 9, 2015

Related U.S. Application Data

(60) Provisional application No. 61/678,210, filed on Aug. 1, 2012.

(51) Int. Cl.
*H04J 11/00* (2006.01)
*H04W 24/10* (2009.01)

(52) U.S. Cl.
CPC ......... *H04J 11/005* (2013.01); *H04J 11/0069* (2013.01); *H04J 11/0086* (2013.01); *H04W 24/10* (2013.01)

(58) Field of Classification Search
None
See application file for complete search history.

(56) References Cited

U.S. PATENT DOCUMENTS 8,140,085 B2 * 3/2012 Chaudhri ............ H04W 72/082
                                                        370/329
9,281,929 B2 * 3/2016 Earnshaw ............. H04W 72/02
(Continued)

FOREIGN PATENT DOCUMENTS

WO   WO 2011/066325 A1   6/2011
WO   WO 2011/127438 A1   10/2011

OTHER PUBLICATIONS

3GPP TS 36.300 V10.4.0 (Jun. 2011); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).
(Continued)

Primary Examiner — Bunjob Jaroenchonwanit
(74) Attorney, Agent, or Firm — Harrington & Smith

(57) ABSTRACT

A method includes receiving, at a user equipment, a signal including cell-specific reference signals from a number of cells. Cell-specific reference signal(s) are measured from one of the cells to determine measured result(s). The user equipment, based on the measured result(s) meeting first criteria, performs interference cancelation to cancel the cell-specific reference signal(s) corresponding to the one cell from the signal. The user equipment performs the measuring and the performing the interference cancelation for additional ones of the cells until second criteria are met. The user equipment uses measured cell-specific reference signals having their interference canceled to reduce an effect of interference from corresponding cells on communications between the user equipment and a base station. A base
(Continued)

station may store cell search information that can be sent to the user equipment to help the user equipment perform the previous method. Apparatus, systems, computer programs, and program products are also disclosed.

30 Claims, 12 Drawing Sheets

(56) References Cited

U.S. PATENT DOCUMENTS

| | | | |
|---|---|---|---|
| 2002/0075833 A1* | 6/2002 | Dick | H04B 1/7083 370/336 |
| 2009/0131037 A1* | 5/2009 | Malladi | H04J 11/0069 455/422.1 |
| 2009/0219860 A1* | 9/2009 | Tanno | H04W 48/12 370/328 |
| 2010/0279707 A1* | 11/2010 | Fischer | G01S 5/021 455/456.1 |
| 2011/0021243 A1* | 1/2011 | Shin | H04W 4/02 455/550.1 |
| 2011/0170435 A1* | 7/2011 | Kim | H04L 5/0023 370/252 |
| 2011/0223901 A1* | 9/2011 | Swarts | H04L 27/2657 455/422.1 |
| 2011/0250919 A1* | 10/2011 | Barbieri | H04L 1/0026 455/509 |
| 2011/0287745 A1* | 11/2011 | Alwan | H04M 1/56 455/412.1 |
| 2011/0287792 A1* | 11/2011 | Zhang | H04J 11/0043 455/501 |
| 2011/0312339 A1* | 12/2011 | Kuningas | G01S 5/0226 455/456.1 |
| 2011/0319091 A1* | 12/2011 | Lee | H04W 72/0426 455/450 |
| 2012/0008565 A1* | 1/2012 | Sun | H04B 7/024 370/328 |
| 2012/0057480 A1* | 3/2012 | Yoo | H04L 5/0023 370/252 |
| 2012/0172041 A1* | 7/2012 | Krishnamurthy | H04J 11/005 455/436 |
| 2012/0176884 A1* | 7/2012 | Zhang | H04B 7/024 370/203 |
| 2012/0188878 A1* | 7/2012 | Simon | H04W 4/06 370/241 |
| 2012/0188959 A1* | 7/2012 | Kim | H04J 11/0069 370/329 |
| 2012/0322492 A1* | 12/2012 | Koo | H04B 7/0417 455/517 |
| 2013/0194953 A1* | 8/2013 | Xu | H04W 52/242 370/252 |
| 2014/0023035 A1* | 1/2014 | Zou | H04W 56/0045 370/331 |
| 2014/0024388 A1* | 1/2014 | Earnshaw | H04L 5/0073 455/452.2 |
| 2015/0016331 A1* | 1/2015 | Kim | H04J 11/005 370/312 |
| 2015/0085833 A1* | 3/2015 | Han | H04J 11/0069 370/336 |
| 2015/0256287 A1* | 9/2015 | Davydov | H04B 7/028 370/329 |
| 2015/0358966 A1* | 12/2015 | Zheng | H04W 72/0446 370/329 |

OTHER PUBLICATIONS

3GPP TS 36.300 V8.12.0 (Mar. 2010), "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 149 pgs.

3GPP TS 36.300 V9.7.0 (Mar. 2011), "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", 174 pgs.

3GPP TR 36.913 V8.0.1 (Mar. 2009), "3$^{rd}$ Generation Partnership Project; Technical Specification Group Radio Access Network; Requirements for further advancements for Evolved Universal Terrestrial Radio Access (E-UTRA) (LTE-Advanced) (Release 8)", 15 pgs.

3GPP TR 36.913 V9.0.0 (Dec. 2009), "3$^{rd}$ Generation Partnership Project; Technical Specification Group Radio Access Network; Requirements for further advancements for Evolved Universal Terrestrial Radio Access (E-UTRA) (LTE-Advanced) (Release 9)", 15 pgs.

3GPP TR36.913 V10.0.0 (Mar. 2011), "3$^{rd}$ Generation Partnership Project; Technical Specification Group Radio Access Network; Requirements for further advancements for Evolved Universal Terrestrial Radio Access (E-UTRA) (LTE-Advanced) (Release 10)", 15 pgs.

3GPP TS 37.320 V10.4.0 (Dec. 2011), "3$^{rd}$ Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); overall description; Stage 2 (Release 10)", 18 pgs.

TSG-SA1 #55, Aug. 2011, Dublin, Ireland, S1-112411, "Study on Proximity-based Services" 3GPP™ Work Item Description, 5 pgs.

* cited by examiner

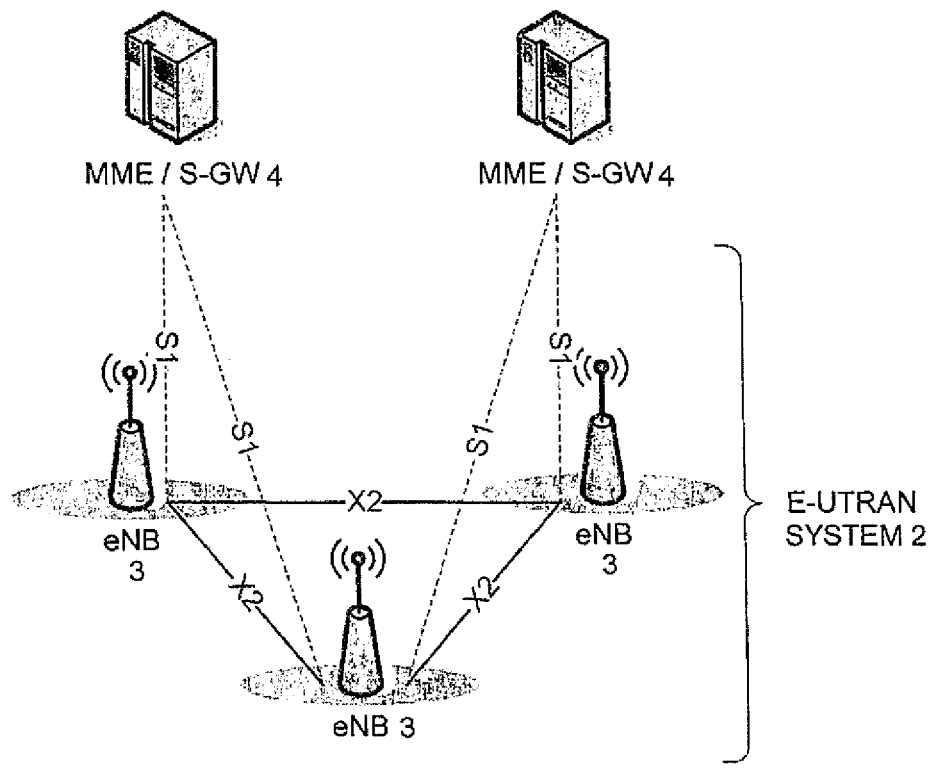
FIG. 1A - Prior Art
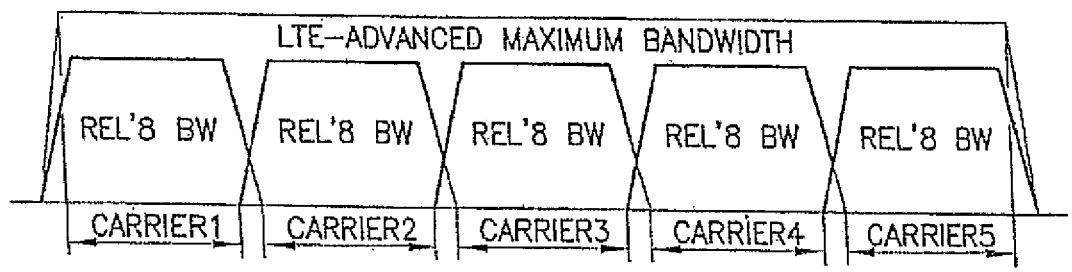
FIG. 1B - Prior Art

CELL-SPECIFIC REFERENCE SIGNAL INTERFERENCE CANCELLATION IMPROVEMENT

TECHNICAL FIELD

The exemplary and non-limiting embodiments of this invention relate generally to wireless communication systems, apparatus, methods and computer program products and, more specifically, relate to inter-cell interference coordination and interference cancellation.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below at the end of the specification but prior to the claims.

The specification of a communication system known as evolved UTRAN (E-UTRAN, also referred to as UTRAN-LTE or as E-UTRA) is currently nearing completion within the 3GPP. As specified the DL access technique is OFDMA, and the UL access technique is SC-FDMA.

One specification of interest is 3GPP TS 36.300, V8.12.0 (2010 04), "3rd Generation Partnership Project; Technical Specification Group Radio Access Network; Evolved Universal Terrestrial Radio Access (E UTRA) and Evolved Universal Terrestrial Access Network (E UTRAN); Overall description; Stage 2 (Release 8)." This system may be referred to for convenience as LTE Rel-8 (which also contains 3G HSPA and its improvements). In general, the set of specifications given generally as 3GPP TS 36.xyz (e.g., 36.211, 36.311, 36.312, etc.) may be seen as describing the Release 8 LTE system. Release 9 versions of these specifications have been published, including 3GPP TS 36.300, V9.7.0 (2011-3). Release 10 versions of these specifications have been published, including 3GPP TS 36.300, V10.4.0 (2011-06).

FIG. 1 reproduces FIG. 4-1 of 3GPP TS 36.300 V8.12.0, and shows the overall architecture of the E UTRAN system 2 (Rel-8). The E-UTRAN system 2 includes eNBs 3, providing the E-UTRAN user plane (PDCP/RLC/MAC/PHY) and control plane (RRC) protocol terminations towards the UE (not shown). The eNBs 3 are interconnected with each other by means of an X2 interface. The eNBs 3 are also connected by means of an S1 interface to an EPC, more specifically to a MME by means of a S1 MME interface and to a S-GW by means of a S1 interface (MME/S-GW 4). The S1 interface supports a many-to-many relationship between MMEs/S-GWs and eNBs.

The eNB hosts the following functions:
functions for RRM: RRC, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or O&M); and
a measurement and measurement reporting configuration for mobility and scheduling.

Of particular interest herein are the further releases of 3GPP LTE (e.g., LTE Rel-10) targeted towards future IMT A systems, referred to herein for convenience simply as LTE-Advanced (LTE A). Reference in this regard may be made to 3GPP TR 36.913, V8.0.1 (2009 03), 3rd Generation Partnership Project; Technical Specification Group Radio Access Network; Requirements for Further Advancements for E UTRA (LTE-Advanced) (Release 8). A goal of LTE-A is to provide significantly enhanced services by means of higher data rates and lower latency with reduced cost. LTE-A is directed toward extending and optimizing the 3GPP LTE Rel-8 radio access technologies to provide higher data rates at very low cost. LTE-A is part of LTE Rel-10. LTE-A is a more optimized radio system fulfilling the ITU-R requirements for IMT-A while maintaining backward compatibility with LTE Rel-8. Reference is further made to a Release 9 version of 3GPP TR 36.913, V9.0.0 (2009-12). Reference is also made to a Release 10 version of 3GPP TR 36.913, V10.0.0 (2011-06).

As is specified in 3GPP TR 36.913, LTE-A should operate in spectrum allocations of different sizes, including wider spectrum allocations than those of Rel-8 LTE (e.g., up to 100 MHz) to achieve the peak data rate of 100 Mbit/s for high mobility and 1 Gbit/s for low mobility. It has been agreed that carrier aggregation is to be considered for LTE-A in order to support bandwidths larger than 20 MHz. Carrier aggregation, where two or more component carriers (CCs) are aggregated, is considered for LTE-A in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation as in LTE Rel 8.

A terminal may simultaneously receive one or multiple component carriers depending on its capabilities. A LTE-A terminal with reception capability beyond 20 MHz can simultaneously receive transmissions on multiple component carriers. A LTE Rel-8 terminal can receive transmissions on a single component carrier only, provided that the structure of the component carrier follows the Rel-8 specifications. Moreover, it is required that LTE-A should be backwards compatible with Rel-8 LTE in the sense that a Rel-8 LTE terminal should be operable in the LTE-A system, and that a LTE-A terminal should be operable in a Rel-8 LTE system.

FIG. 1B shows an example of the carrier aggregation, where M Rel-8 component carriers are combined together to form M×Rel-8 BW (e.g., 5×20 MHz=100 MHz given M=5). Rel-8 terminals receive/transmit on one component carrier, whereas LTE-A terminals may receive/transmit on multiple component carriers simultaneously to achieve higher (wider) bandwidths.

With further regard to carrier aggregation, what is implied is that one eNB can effectively contain more than one cell on more than one CC (frequency carrier), and the eNB can utilize one (as in E-UTRAN Rel-8) or more cells (in an aggregated manner) when assigning resources and scheduling for the UE.

ICIC was introduced in Rel-8/9 of the 3GPP LTE standards. The basic idea of ICIC is keeping the inter-cell interferences under control by RRM methods. ICIC is inherently a multi-cell RRM function that needs to take into account information from multiple cells (e.g., resource usage status and traffic load situation).

Generally, the main target of any ICIC strategy is to determine the resources (e.g., bandwidth and power) available at each cell at any time. Then (and typically), an autonomous scheduler assigns those resources to users. Thus, from the RRC perspective, there are two kinds of decisions: (a) which resources to allocate to each cell, and (b) which resources to allocate to each user. Clearly, the temporality of such decisions is quite different. Whereas user allocations are on the order of milliseconds, the cell allocations span much longer periods of time or can be fixed.

Static ICIC schemes are attractive for operators since the complexity of their deployment is very low and there is no need for new or extra signaling. Static ICIC mostly relies on the fractional reuse concept. This means that users are categorized according to their SINR (essentially according to their inter-cell interference) and different reuse factors are applied to them, being higher at regions with more interference, mostly outer regions of the cells. The total system bandwidth is divided into sub-bands which are used by the scheduler accordingly.

For example, the users may be divided into two categories: Cell Center Users (CCUs) and Cell Edge Users (CEUs). CCUs are the users distributed towards the center of a given cell, whereas CEUs are the users distributed towards the edges of a given cell. CCUs can use all the frequency points to communicate with the base station, while CEUs must use corresponding specified frequency points to ensure orthogonality between different cells (e.g., since CEUs will necessarily be subject to inter-cell interference).

CEUs can be assigned a higher transmission power as the frequency reuse factor is greater than 1. The frequency points are not overlapped at the edges so the adjacent cell interference is small. CCUs frequency reuse factor is 1 as the path loss is small and transmission power is low. Therefore, the interference with adjacent cells is not high either.

Interference avoidance based on frequency-domain partitioning between different cells is of limited benefit for synchronization signals, PBCH, CRSs or control channels (e.g., PDCCH, PCFICH, PHICH). These are needed for initial access to the network and/or thereafter for maintaining the radio link. Therefore, their time-frequency locations are fixed (excepting CRSs, which can use a frequency reuse factor of 3 or 6 depending on the number of antenna ports configured) and frequency partitioning of these channels and signals would not be backwards compatible with Rel-8/9 UEs. However, the interference experienced by the pico cell UEs in a co-channel macro-pico deployment also affects these channels and, if large range expansion is employed, control channel reception at the pico cell UEs may fail, resulting in outage.

Such a need for interference mitigation of the control channels was the motivation for time-domain-based ICIC in Rel-10. The overall objective of eICIC is to mute certain subframes of one layer of cells in order to reduce interference with the other layer. These muted subframes are referred to as ABSs.

ABSs are subframes with reduced DL transmission power and/or activity. Ideally, ABSs would be completely blank in order to remove as much interference as possible. However, one still wants to balance the gains from interference reduction with the loss of transmission resources (e.g., from being unable to transmit PDSCH data in the ABSs). Furthermore, a desire for backwards compatibility means that cells must remain accessible and measurable for Rel-8/9 UEs. CRS is at least transmitted in ABS subframes so legacy UEs can use it for various measurements. In addition, PHICH is also transmitted in ABS subframes to avoid shutting off the corresponding uplink subframes. Nonetheless, even with these transmissions the ABSs can contain much less energy than normal subframes and, thus, reduce interference.

eICIC effectively extends ICIC to DL control in the time domain. eICIC requires synchronization at least between the macro eNB and the low power eNBs in its footprint, such as those eNBs, base stations or access points (e.g., HeNBs) that are serving femto or pico cells, for example. eICIC does not have a negative impact on legacy Rel 8 use (e.g., legacy UEs and legacy users).

RE refers to a UE's ability to connect and stay connected to a cell with low SINR. This is achieved with advanced UE receivers that use DL IC.

Use of both eICIC and RE techniques eliminates coverage holes created by closed HeNBs (e.g., privately operated HeNBs that do not allow for open, public access). Furthermore, these techniques improve load balancing potential for macro networks with low power eNBs and may lead to significant network throughput increase. In addition, these techniques enable more UEs to be served by low power eNBs, which can lead to substantially higher overall network throughput.

SUMMARY

This section contains examples of possible implementations and is not meant to be limiting.

An exemplary embodiment in a first aspect is a method, comprising: receiving, at a user equipment, a signal comprising cell-specific reference signals from a plurality of cells; measuring by the user equipment one or more cell-specific reference signals from one of the plurality of cells to determine one or more measured results; performing, by the user equipment and based on the one or more measured results meeting one or more first criteria, interference cancelation to cancel the one or more cell-specific reference signals corresponding to the one cell from the signal; performing, by the user equipment, the measuring and the performing the interference cancelation for additional ones of the plurality of cells until one or more second criteria are met; and using measured cell-specific reference signals having their interference canceled to reduce an effect of interference from corresponding cells on communications between a user equipment and a base station.

A method as above, further comprising receiving cell search information and using the cell search information for the measuring the one or more first cell-specific reference signals. A method as in this paragraph, wherein receiving search information further comprises receiving the cell search information from the base station, wherein the base station services a first cell of the plurality of cells, and wherein the first cell is a serving cell for the user equipment. A method as in this paragraph, wherein the cell search information comprises cell identifications, timing information, and cyclic prefixes for at least some of the plurality of cells. A method as in this paragraph, wherein the cell search information comprises a list of cell identifications, timing information, and cyclic prefixes for cells from the plurality of cells. A method as in this paragraph, further comprising creating by the user equipment a database of information corresponding to the cell-specific reference signals for at least some of the plurality of cells and location information for the some of the plurality of cells. The method of the previous sentence, further comprising using the database to determine which cells at a location are cells creating interference for a communication between the user equipment and a base station providing access by the user equipment to a wireless network, and using the cells creating interference from the database to select cells for performing the measuring and the performing interference cancelation. A method of this paragraph, where the measuring and performing are performed for a second base station serving a second cell, and wherein the interference cancellation is performed in response to determining by the user equipment that a cell-specific reference signal of the second of the plurality of cells interferes with a communication that occurs between the user equipment and the base station. The method of the previous paragraph, wherein performing the measuring and the performing the interference cancelation for additional ones of the plurality of cells until one or more second criteria are met further comprises: measuring one or more cell-specific reference signals from a third base station servicing a third cell, where a first coverage of the first cell at least partially overlaps a third coverage of the third cell; and performing, responsive to the one or more measured results from the third cell meeting one or more first criteria, interference cancellation to reduce an effect of the third cell on communications that occur between the user equipment and the first cell.

A method as in the above first aspect, wherein performing the measuring and performing interference cancelation is performed for the additional cells having a coverage that at least partially overlaps with a first coverage of a first cell formed by a base station, where the first cell is a serving cell for the user equipment. A method as in the above first aspect, wherein the one or more first criteria comprise one of a level of interference, a specified signal to noise ratio, or a signal to interference plus noise ratio. A method as in the above first aspect, wherein the one or more second criteria comprise one of: a channel estimate for a selected cell is not accurate enough based on an estimated signal to noise ratio or signal to interference plus noise ratio; a certain number of interfering signals have been canceled; or an estimated quality of a signal received from a base station providing access by the user equipment to a wireless network meets a condition. The method of this paragraph, wherein the estimated quality of the signal received from a current access base station is determined to meet the condition in response to the received signal being determined to be good enough based on an estimated signal to interference plus noise ratio, or in response to enough interference has been canceled such that a noise level is within an acceptable range. A method as in the above first aspect, further comprising performing one or more cell-specific reference signal measurements for cells deemed to be interfering during measurement opportunities provided by a base station, wherein the base station provides access by the user equipment to a wireless network, adjusting gain control using the one or more cell-specific reference signal measurements, and using the adjusted gain control for the performing interference cancelation. A method as in the above first aspect, wherein: performing interference cancelation for a selected cell comprises creating a cell-specific reference signal waveform for the selected cell, applying gain to the created cell-specific reference signal waveform to create a gain-adjusted cell-specific reference signal waveform, and adding the gain-adjusted cell-specific reference signal waveform to the received signal to create a resultant signal; and using measured cell-specific reference signals having their interference canceled further comprises performing analog to digital conversion on the resultant signal.

The method of the first aspect, wherein the cell-specific reference signal waveform is generated using at least a cell identification of the selected cell. The method of the previous sentence, wherein the cell-specific reference signal waveform is generated further using at least a slot number index corresponding to the selected cell.

In a second aspect, an apparatus comprises: means for receiving, at a user equipment, a signal comprising cell-specific reference signals from a plurality of cells; means for measuring by the user equipment one or more cell-specific reference signals from one of the plurality of cells to determine one or more measured results; means for performing, by the user equipment and based on the one or more measured results meeting one or more first criteria, interference cancelation to cancel the one or more cell-specific reference signals corresponding to the one cell from the signal; means for performing, by the user equipment, the measuring and the performing the interference cancelation for additional ones of the plurality of cells until one or more second criteria are met; and means for using measured cell-specific reference signals having their interference canceled to reduce an effect of interference from corresponding cells on communications between a user equipment and a base station.

An apparatus as in the second aspect, further comprising means for receiving cell search information and means for using the cell search information for the measuring the one or more first cell-specific reference signals. The apparatus of this paragraph, wherein the means for receiving search information further comprises means for receiving the cell search information from the base station, wherein the base station services a first cell of the plurality of cells, and wherein the first cell is a serving cell for the user equipment. An apparatus of this paragraph, wherein the cell search information comprises cell identifications, timing information, and cyclic prefixes for at least some of the plurality of cells. An apparatus of this paragraph, wherein the cell search information comprises a list of cell identifications, timing information, and cyclic prefixes for cells from the plurality of cells. An apparatus of this paragraph, further comprising means for creating by the user equipment a database of information corresponding to the cell-specific reference signals for at least some of the plurality of cells and location information for the some of the plurality of cells. The apparatus of the previous sentence, further comprising means for using the database to determine which cells at a location are cells creating interference for a communication between the user equipment and a base station providing access by the user equipment to a wireless network, and means for using the cells creating interference from the database to select cells for performing the measuring and the performing interference cancelation.

An apparatus of the second aspect, where the measuring and performing are performed for a second base station serving a second cell, and wherein the interference cancellation is performed in response to determining by the user equipment that a cell-specific reference signal of the second of the plurality of cells interferes with a communication that occurs between the user equipment and the base station. The apparatus of the previous sentence, wherein the means for performing the measuring and the performing the interference cancelation for additional ones of the plurality of cells until one or more second criteria are met further comprises: means for measuring one or more cell-specific reference signals from a third base station servicing a third cell, where a first coverage of the first cell at least partially overlaps a third coverage of the third cell; and means for performing, responsive to the one or more measured results from the third cell meeting one or more first criteria, interference cancellation to reduce an effect of the third cell on communications that occur between the user equipment and the first cell.

An apparatus of the second aspect, wherein the performing the measuring and performing interference cancelation is performed for the additional cells having a coverage that at least partially overlaps with a first coverage of a first cell formed by a base station, where the first cell is a serving cell for the user equipment. An apparatus of the second aspect, wherein the one or more first criteria comprise one of a level of interference, a specified signal to noise ratio, or a signal to interference plus noise ratio. An apparatus of the second aspect, wherein the one or more second criteria comprise one of: a channel estimate for a selected cell is not accurate enough based on an estimated signal to noise ratio or signal to interference plus noise ratio; a certain number of interfering signals have been canceled; or an estimated quality of a signal received from a base station providing access by the user equipment to a wireless network meets a condition. The apparatus of the previous sentence, wherein the estimated quality of the signal received from a current access base station is determined to meet the condition in response to the received signal being determined to be good enough based on an estimated signal to interference plus noise ratio, or in response to enough interference has been canceled such that a noise level is within an acceptable range.

An apparatus of the second aspect, further comprising means for performing one or more cell-specific reference signal measurements for cells deemed to be interfering during measurement opportunities provided by a base station, wherein the base station provides access by the user equipment to a wireless network, means for adjusting gain control using the one or more cell-specific reference signal measurements, and means for using the adjusted gain control for the performing interference cancelation. An apparatus of the second aspect, wherein: the means for performing interference cancelation for a selected cell comprises means for creating a cell-specific reference signal waveform for the selected cell, means for applying gain to the created cell-specific reference signal waveform to create a gain-adjusted cell-specific reference signal waveform, and means for adding the gain-adjusted cell-specific reference signal waveform to the received signal to create a resultant signal; and the means for using measured cell-specific reference signals having their interference canceled further comprises means for performing analog to digital conversion on the resultant signal.

The apparatus of the second aspect, wherein the cell-specific reference signal waveform is generated using at least a cell identification of the selected cell. The apparatus of the previous sentence, wherein the cell-specific reference signal waveform is generated further using at least a slot number index corresponding to the selected cell.

Another (third) aspect is a user equipment comprising the apparatus of any one of apparatuses of the first aspect.

A fourth aspect is a method, comprising: storing, by a first base station servicing a first cell of a wireless communication network, cell search information; and sending the cell search information towards an apparatus, where the first cell is a serving cell for the apparatus, where the cell search information enables the apparatus to measure at least one cell-specific reference signal from a second base station that services a second cell of the wireless communication network, determine if the measured cell-specific reference signal interferes with communications for the apparatus, and perform interference cancellation to reduce an effect of the second cell on the communications.

A method of the fourth aspect, wherein the cell search information comprises cell identifications, timing information, and cyclic prefixes for at least some of the plurality of cells. A method of the fourth aspect, wherein the cell search information comprises a list of cell identifications, timing information, and cyclic prefixes for cells from the plurality of cells.

A method of the fourth aspect, wherein the cell search information that is sent toward the apparatus is based on a location of the apparatus. A method of the fourth aspect, further comprising: receiving a message from a cell that is to handover the apparatus to the base station, wherein the message provides an indication of the location of the apparatus; looking in a database of cell search information for a location in the database deemed within a proximity from the location of the apparatus; and sending cell search information for the location in the database deemed within a proximity from the location of the apparatus to the cell.

In a fifth aspect, an apparatus comprises: means for storing, by a first base station servicing a first cell of a wireless communication network, cell search information; and means for sending the cell search information towards an apparatus, where the first cell is a serving cell for the apparatus, where the cell search information enables the apparatus to measure at least one cell-specific reference signal from a second base station that services a second cell of the wireless communication network, determine if the measured cell-specific reference signal interferes with communications for the apparatus, and perform interference cancellation to reduce an effect of the second cell on the communications.

An apparatus of the fifth aspect, wherein the cell search information comprises cell identifications, timing information, and cyclic prefixes for at least some of the plurality of cells. An apparatus of the fifth aspect, wherein the cell search information comprises a list of cell identifications, timing information, and cyclic prefixes for cells from the plurality of cells.

An apparatus of the fifth aspect, wherein the cell search information that is sent toward the apparatus is based on a location of the apparatus. An apparatus of the fifth aspect, further comprising: means for receiving a message from a cell that is to handover the apparatus to the base station, wherein the message provides an indication of the location of the apparatus; means for looking in a database of cell search information for a location in the database deemed within a proximity from the location of the apparatus; and means for sending cell search information for the location in the database deemed within a proximity from the location of the apparatus to the cell.

In a sixth aspect, a base station comprises the apparatus of any one of the apparatuses of the fifth aspect.

In a seventh aspect, a communication system comprises the apparatus in accordance with any one of the apparatuses of the second aspect and/or the apparatus in accordance with any one of the apparatuses of the fifth aspect.

An eighth aspect includes a computer program comprising program code for executing the method according to any of the methods of the first aspect or the methods of the fourth aspect. The computer program according to this paragraph, wherein the computer program is a computer program product comprising a computer-readable medium bearing computer program code embodied therein for use with a computer.

In a ninth aspect, an apparatus comprises one or more processors and one or more memories including computer program code. The one or more memories and the computer program code configured, with the one or more processors, to cause the apparatus to perform any of the methods of the first aspect.

In a tenth aspect, an apparatus comprises one or more processors and one or more memories including computer program code. The one or more memories and the computer program code configured, with the one or more processors, to cause the apparatus to perform any of the methods of the fourth aspect.

BRIEF DESCRIPTION OF THE DRAWINGS

In the attached drawing figures:

FIG. 1A reproduces FIG. 4-1 of 3GPP TS 36.300 V8.12.0, and shows the overall architecture of the E UTRAN system;

FIG. 1B shows an example of carrier aggregation as proposed for the LTE-A system;

DETAILED DESCRIPTION OF THE DRAWINGS

Figure 2A:
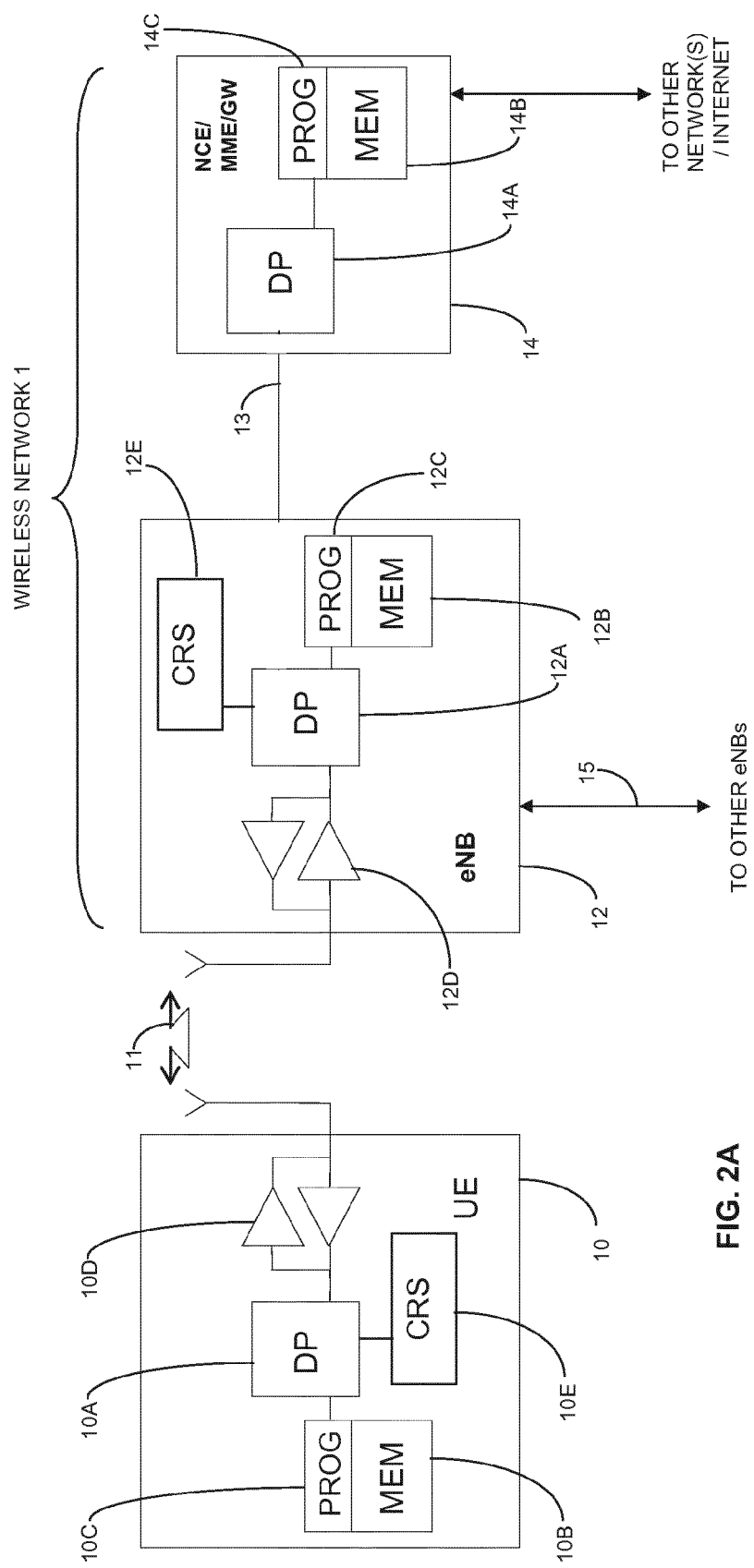
FIG. 2A shows a simplified block diagram of various exemplary electronic devices that are suitable for use in practicing the exemplary embodiments of this invention.

HetNet indicates the use of multiple types of access nodes in a wireless network. A WAN can use macrocells, microcells, picocells, and/or femtocells, for example, in order to offer wireless coverage in an environment with a wide variety of wireless coverage zones, ranging from an open outdoor environment to office buildings, homes, and underground areas, as non-limiting examples. A HetNet is a network with complex interoperation between macrocell, small cell, and in some cases WiFi network elements used together to provide a mosaic of coverage, with handoff capability between the different network elements.

A picocell is a small cellular base station typically covering a small area, such as in-building (e.g., offices, shopping malls, train stations, stock exchanges, etc.), or more recently in-aircraft. In cellular networks, picocells are typically used to extend coverage to indoor areas where outdoor signals do not reach well, or to add network capacity in areas with very dense phone usage, such as train stations, for example. Picocells provide coverage and capacity in areas difficult or expensive to reach using the more traditional macrocell approach. Picocells offer many of the benefits of "small cells" (similar to femtocells) in that they improve data throughput for mobile users and increase capacity in the mobile network. In particular, the integration of picocells with macrocells through a HetNet can be useful in seamless handoffs and increased mobile data capacity. Picocells are available for most cellular technologies including GSM, CDMA, UMTS and LTE, as non-limiting examples.

A microcell is a cell in a mobile phone network served by a low power cellular base station (e.g., tower), covering a limited area such as a mall, a hotel, or a transportation hub, as non-limiting examples. A microcell is usually larger than a picocell, though the distinction is not always clear.

A femtocell is a small cellular base station, typically designed for use in a home or small business. It may connect to the service provider's network via broadband (such as DSL or cable). Current designs typically support 2-4 active mobile phones in a residential setting, and 8-16 active mobile phones in enterprise settings. A femtocell allows service providers to extend service coverage indoors, for example, especially where access would otherwise be limited or unavailable. Femtocells are available for most wireless technologies, including WCDMA, GSM, CDMA2000, TD-SCDMA, WiMAX and LTE, as non-limiting examples.

As non-limiting examples for comparison purposes, typically the range of a microcell is less than two kilometers wide, a picocell is 200 meters or less, and a femtocell is on the order of 10 meters.

A macrocell is a cell in a mobile phone network that provides radio coverage served by a high power cellular base station (e.g., via a tower). Generally, a macrocell provides coverage larger than a microcell. The antennas for macrocells are mounted on ground-based masts, rooftops and other existing structures, at a height that provides a clear view over the surrounding buildings and terrain, for example. Macrocell base stations typically have power outputs on the order of tens of watts.

With respect to eICIC, as noted above it is important for a UE receiver to be CRS-interference aware. In order for RAN4 to specify the performance requirement under CRS interference, certain types of CRS-interference cancellation/mitigation algorithms shall be modeled. Below are provided preliminary models for CRS interference cancellation which may be used to study and consider the potential performance gain. The study could be used to specify the new UE performance requirements under CRS interference.

As noted above, the eICIC method of LTE rel-10 uses ABSs to facilitate HetNet deployment with pico or femto cells. A cell selection bias is used for a UE so that the UE can select a pico cell with lower received power over a macro cell with higher received power. When it is communicating with the pico cell, the UE may suffer substantial interference from the macro cell. With the ABS scheme, this interference will be from the macro cell's CRS signal.

Based on 3GPP RAN1's findings, a 9 dB bias for CRE is used. Some companies have shown significant throughput in various HetNet scenarios with cell selection bias at 14 dB or even 18 dB. This high bias leads to substantial challenges in UE receiver design. With strong co-channel interference from the macro cell, the whole receiver chain of a UE (e.g., LNA, mixer, amplifier and ADC) needs to be examined. When an ABS pattern is applied at the macro eNB, the amplitude of the combined signals seen at UE antennas fluctuates drastically from symbol to symbol. For example, using two antenna ports for transmission at the macro eNB, symbols 0, 4, 7 and 11 at a pico UE in CRE coverage experience much higher amplitude then the rest of the symbols, which makes it unrealistic to use AGC at the UE to control the dynamic range adaptively.

While all the stages in the receiver chain impact the CRS interference cancellation performance, one stage particularly pertinent to receiver performance evaluation is the ADC. As the ADC on a UE normally does not have as many effective bits as that on an eNB, the relatively small dynamic range due to the ADC's limitation and the relatively large dynamic range required by CRE operation have to be captured in the study item stage. Without considering the limited dynamic range due to ADC, the resulting conclusions will not be relevant for understanding the gain achievable in a UE. Only through careful consideration will the resulting conclusions be meaningful when deriving performance requirements.

As an example, an 18 dB bias roughly translates into 3 additional bits for ADC and baseband processing. In such a case, a conventional implementation of a UE receiver supporting ABS operation will not be power efficient and/or area efficient. Thus, the UE's ADC needs to be designed for the worst case scenario and at least 3 additional bits are needed beyond those currently in use.

As noted above, in LTE Rel-10, ABS was introduced to facilitate HetNet deployment with pico/femto cells. In the context of pico deployment, a cell selection bias is used for a UE so the UE can choose a pico cell with lower received power over a macro cell with higher received power. When a UE tries to receive signals and channels from the pico cell, the UE sees substantial interference from the macro cell. Even with ABS, the UE still sees substantial interference from the CRS of the macro cell.

Below are discussed some of the challenges with CRS interference cancellation, particularly those due to limited dynamic range of ADC. Substantial gain may be realized when the limit due to dynamic range is lifted. From the description below, it can be seen that in symbols where macro CRS interference exists in the floating point receiver model, even though the interference signal can be several orders stronger than the desired signal, the interference signal can be estimated from the incoming signal and subsequently removed. For example, in the IEEE 754 double-precision floating-point format, the step between two neighboring numbers is so small that one can say the incoming signal is not quantized for all practical purposes or, in another words, the ideal receiver has infinite dynamic range: quantization error for the interfering signal or desired signal is not a concern at all.

In contrast, in a practical UE receiver, the dynamic range is limited. For example, a UE may have an ADC with 10 effective-number-of-bits. The incoming signal is sampled and quantized by the ADC and passed to the baseband processing. The quantization noise can manifest itself in multiple ways depending on the gain setting and relative strength of the interfering and desired signals. For example, consider an example where the macro CRS interfering signal is at 18 dB higher than the desired signal and assume that the interfering signal has a peak-to-average ratio of about 10 dB. The gain setting before ADC can be adjusted so the interfering signal's RMS value is at about 8 bits. As the desired signal is at 18 dB below the interfering signal, the desired signal's RMS value is at about 5 bits. If there is no interference signal, the gain setting before ADC can be adjusted so that the desired signal's RMS value is at about 8 bits. From this, one can see that when the interference is present, the dynamic range of the desired signal is severely impacted. In this example, it was implicitly assumed that suppressing the dynamic range is a viable choice for the UE implementation, which may be true if a wide margin in dynamic range was budgeted in the UE design. If the dynamic range of the UE needs to be preserved (for example to 8 bits even when the interference is presented), then the UE implementation capable of CRS interference cancellation needs to find a new ADC with 3 additional effective-number-of-bits (following the example before, now one is looking at 13 effective-number-of-bits). This is a rather costly change. A better way than putting all the burden on ADC is to substantially subtract (e.g., remove or cancel) the interfering signal from the incoming signal before the signal goes to the ADC, then the existing ADC in a UE implementation is not impacted even when the UE operates in an environment with severe macro CRS interference. To understand the performance gain under a realistic setup, three proposals are discussed.

PROPOSAL 1: Adopt a receiver chain model which includes at least the analog-to-digital converter to evaluate receiver performance realistically.

On each RS and data RE, one has the following receiver model:

$$r = H_0 x_0 + \sum_{i=1}^{N} H_i x_i + n,$$

where $H_0$ is the matrix channel for the desired signal, $H_i$ i=1, 2, 3, . . . is for interfering CRS, and n captures thermal noise and other cell interference not modeled by $H_i$. Let $H_{i,r,t}$ be the channel gain at the r-th reception (rx) antenna of the UE from the t-th transmission (tx) antenna of cell i, $1 \le r \le N_r$, $1 \le t \le N_t$, where $N_r$ and $N_t$ are the number of receive and transmit antennas, respectively. For a UE attached to a pico through cell range extension, the UE sees severe CRS interference from the macro(s). Suppose $H_i$ is ordered in descending power from i=1 to i=N, a reasonable CRS interference cancellation scheme is to model the channel for the strongest interfering CRS, remove its estimate from the receiver model, go to the next interfering CRS, estimate the channel and remove its estimate from the receiver model. This is a similar procedure as (pre-decoding) peeling in multiuser detection. It should be noted that the peeling order for each tx-rx pair may be different due to multipath channels. For simplicity of presentation, assume the peeling order is the same for all tx-rx pairs and use the matrix notations conveniently.

When the channel for the first interfering CRS is estimated, all other interfering CRSs plus the desired signal are treated as noise. On each tx-rx pair (r,t), the SNR is given as:

$$SNR_{1,r,t} = \frac{|H_{1,r,t}|^2 \sigma_{1,t}^2}{\sum_{i=0,2:N,} \sum_{q=1}^{N_t} |H_{i,r,q}|^2 \sigma_{i,q}^2 + \sigma_{n,r}^2}$$

where $\sigma_i^2$ is the CRS RE power, i=1, 2, 3, . . . , $\sigma_0^2$ is the desired signal RE power.

Then the estimate error $\sigma_{1,r,t,residue}^2$ for $H_{1,r,t}$ (the channel response for CRS 1) is looked up from the link curve for the chosen channel model:

$$\sigma_{1,r,t,residue}^2 = |H_{1,r,t}|^2 f_{channel}(SNR_{1,r,t}).$$

Assume the channel estimate of CRS 1 is $H_{1,r,t}$, and $\hat{H}_1$ is the estimate of $H_1$. After the first peeling, one has:

$$\tilde{r} = H_0 x_0 + \sum_{i=2}^{N} H_i x_i + \Delta H_1 x_1 + n,$$

where $\Delta H_1 = H_1 - \hat{H}_1$.

Now the channel for CRS 2 is estimated, on tx-rx pair (r,t), the SNR is given as $$SNR_{2,r,t} = \frac{|H_{2,r,t}|^2 \sigma_{2,t}^2}{\sum_{i=0,3:N,} \sum_{q=1}^{N_t} |H_{i,r,q}|^2 \sigma_{i,q}^2 + \sum_{q=1}^{N_t} \sigma_{1,r,q,residue}^2 \sigma_{1,q}^2 + \sigma_{n,r}^2}.$$

Now the same procedure as for the first CRS can be applied.

In general, one can recursively compute $SNR_{i,r,t}$, the SNR for CRS i on the rx-tx pair (r,t) after interference cancellation for CRSs 1, . . . , i−1:

$$SNR_{i,r,t} = \frac{|H_{i,r,t}|^2 \sigma_{i,t}^2}{\sum_{j=0,i+1:N,} \sum_{q=1}^{N_t} |H_{j,r,q}|^2 \sigma_{j,q}^2 + \sum_{j=1}^{i-1} \sum_{q=1}^{N_t} \sigma_{j,r,q,residue}^2 \sigma_{j,q}^2 + \sigma_{n,r}^2}$$

And finally one has the receiver model for the desired signal after interference cancellation for CRSs i=1, . . . , N:

$$\tilde{r} = H_0 x_0 + \underbrace{\sum_{i=1}^{N} \Delta H_i x_i + n}_{\tilde{n}},$$

and the SNR for the desired signal is given by $$SNR_{0,r,t} = \frac{|H_{0,r,t}|^2 \sigma_{0,t}^2}{\sum_{j=1}^{N} \sum_{q=1}^{N_t} \sigma_{j,r,q,residue}^2 \sigma_{j,q}^2 + \sigma_{n,r}^2}.$$

PROPOSAL 2: Adopt the receiver model for CRS interference cancellation as discussed herein for performance evaluation.

With regard to assumed knowledge for UE concerning CRS interference, if a UE has an ADC with infinite dynamic range, the macro CRS interference may be identified through cell search at the UE and the interference is subsequently cancelled in the receiver. Yet with a limited dynamic range at the UE receiver, it is not realistic to assume that the UE knows all the dominant interference signals a priori. Some kind of CRS discovery stage/opportunities, or network-aided solution has to be considered. It is important to state the assumed knowledge that the UE has concerning CRS interference and the mechanism through which the UE acquires that knowledge.

PROPOSAL 3: Performance of the CRS interference receiver should be accompanied with clearly stated assumptions on the mechanism/procedure/opportunities through which a UE acquires the identities of dominant CRS interference.

To fully capture the performance gain with the CRS interference cancellation, spatial channel models rather than simplistic correlation models should be exploited for both the desired and interfering signals. Simulation results are provided for multiple channel models. From these results, it can be seen that performance improvement due to CRS interference cancellation is quite encouraging and the right channel model and ADC model should be considered for further study. In all simulations, the CRS interference is at 5 dB higher than the desired signal.

Exemplary embodiments of the invention utilize new CRS interference cancellation approaches to mitigate CRS waveforms from one or more interfering cells. In at least some exemplary embodiments, a power management circuit and the relative protocol for UE measurements are proposed for CRS interference cancellation. The cancellation is performed in the analog domain before ADC. Lower ADC requirements and associated wider deployment of enhanced LTE UEs will improve the overall performance of the corresponding LTE network.

Before describing in further detail the exemplary embodiments of this invention, reference is made to FIG. 2A for illustrating a simplified block diagram of various exemplary electronic devices and apparatus that are suitable for use in practicing the exemplary embodiments of this invention. In FIG. 2A, a wireless network 1 is adapted for communication over a wireless link 11 with an apparatus, such as a mobile communication device which may be referred to as a user equipment (UE) 10, via a network access node, such as a Node B (base station), and more specifically an eNB 12. The network 1 may include a network control element (NCE) 14 that may include the MME/S GW functionality shown in FIG. 1, and which provides connectivity with one or more other networks, such as a telephone network and/or a data communications network (e.g., the Internet). The UE 10 includes a controller, such as a computer, processor or data processor (DP) 10A, a computer-readable memory medium embodied as a memory (MEM) 10B that stores a program of computer instructions (PROG) 10C, and a suitable radio frequency (RF) interface 10D for bidirectional wireless communications with the eNB 12 via one or more antennas.

The eNB 12 includes a controller, such as a computer, processor or data processor (DP) 12A, a computer-readable memory medium embodied as a memory (MEM) 12B that stores a program of computer instructions (PROG) 12C, and a suitable radio frequency (RF) interface 12D for communication with the UE 10 via one or more antennas. The eNB 12 is coupled via a data/control path 13 to the NCE 14. As a non-limiting example, the path 13 may be implemented as the S1 interface shown in FIG. 1.

The NCE 14 includes a controller, such as a computer, processor or data processor (DP) 14A and a computer-readable memory medium embodied as a memory (MEM) 14B that stores a program of computer instructions (PROG) 14C. As noted above, the NCE 14 is coupled via a data/control path 13 to the eNB 12. The eNB 12 may also be coupled to one or more other eNBs via data/control path 15, which may be implemented as the X2 interface shown in FIG. 1, for example.

The RF interface 10D, 12D of the UE 10 and/or eNB 12 may comprise one or more transmitters, one or more receivers and/or one or more transceivers, as non-limiting examples. In other exemplary embodiments, the RF interface 10D, 12D of the UE 10 and/or eNB 12 may comprise one or more wireless interfaces and/or one or more communication components configured to perform unidirectional and/or bidirectional wireless communication with one or more other apparatus and/or devices.

At least one of the PROGs 10C and 12C is assumed to include program instructions that, when executed by the associated DP 10A, 12A, enable the respective device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention, the UE 10 may be assumed to also include a CRS block (CRS) 10E, and the eNB 12 may include a CRS block (CRS) 12E. These CRS 10E, 12E may comprise at least one processor, at least one storage component (e.g., memory), at least one program (e.g., executable by the DP 10A, 12A and/or other circuitry), at least one antenna, at least one circuit, at least one integrated circuit, at least one function, at least one processing block and/or other components. The CRS 10E, 12E assists the respective apparatus UE 10, eNB12 in the transmission (e.g., eNB12), reception (e.g., UE 10) and/or detection (e.g., UE 10) of CRS. In some exemplary embodiments, the CRS 10E, 12E additionally or instead provides instructions governing the transmission and/or reception of CRS.

In general, the various embodiments of the UE 10 can include, but are not limited to, mobile nodes, mobile stations, mobile phones, cellular phones, personal digital assistants (PDAs) having wireless communication capabilities, mobile routers, relay stations, relay nodes, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

Figure 2B:
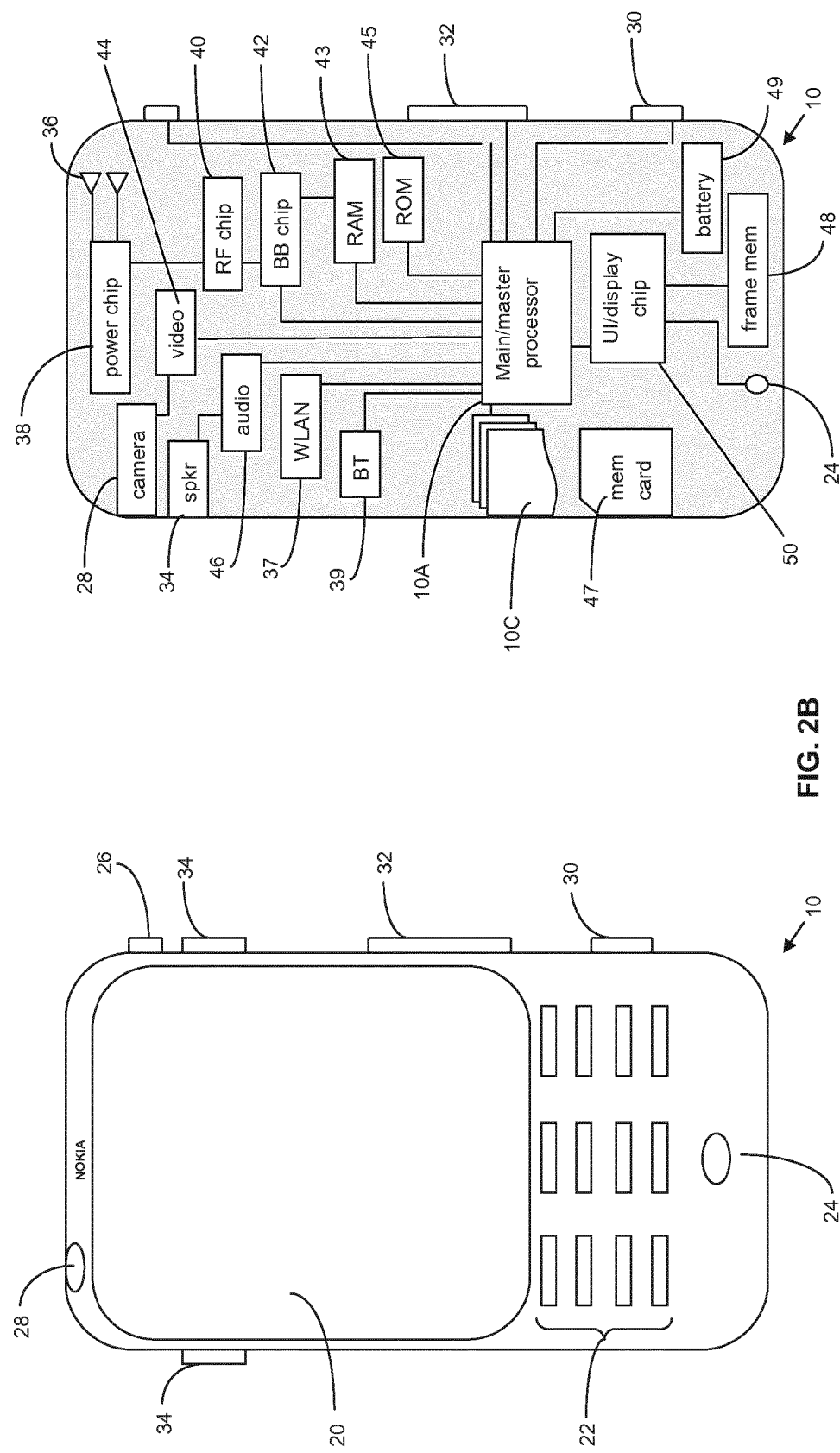
FIG. 2B shows a more particularized block diagram of an exemplary user equipment such as that shown in FIG. 2A.

FIG. 2B illustrates further detail of an exemplary UE 10 in both plan view (left) and sectional view (right). Exemplary embodiments of the invention may be embodied in one or more combinations that include one or more function-specific components, such as those shown in FIG. 2B. As shown in FIG. 2B, the UE 10 includes a graphical display interface 20, a user interface 22 comprising a keypad, a microphone 24 and speaker(s) 34. In further exemplary embodiments, the UE 10 may also encompass touch-screen technology at the graphical display interface 20 and/or voice-recognition technology for audio signals received at the microphone 24. A power actuator 26 controls the UE 10 being turned on and/or off by the user. The UE 10 may include a camera 28, which is shown as forward facing (e.g., for video calls) but may alternatively or additionally be rearward facing (e.g., for capturing images and video for local storage). The camera 28 may be controlled by a shutter actuator 30 and optionally by a zoom actuator 32, which may alternatively function as a volume adjustment for the speaker(s) 34 when the camera 28 is not in an active mode.

Within the sectional view of FIG. 2B are seen multiple transmit/receive antennas 36 that are typically used for wireless communication (e.g., cellular communication). The antennas 36 may be multi-band for use with other radios in the UE. The operable ground plane for the antennas 36 is shown by shading as spanning the entire space enclosed by the UE housing, though in some embodiments the ground plane may be limited to a smaller area, such as disposed on a printed wiring board on which a power chip 38 is formed. The power chip 38 controls power amplification on the channels being transmitted on and/or across the antennas that transmit simultaneously, where spatial diversity is used, and amplifies received signals. The power chip 38 outputs the amplified received signal to the radio frequency (RF) chip 40, which demodulates and downconverts the signal for baseband processing. The baseband (BB) chip 42 detects the signal, which is then converted to a bit-stream and finally decoded. Similar processing occurs in reverse for signals generated in the UE 10 and transmitted from it.

Signals to and from the camera 28 pass through an image/video processor (video) 44, which encodes and decodes the image data (e.g., image frames). A separate audio processor 46 may also be present to control signals to and from the speakers (spkr) 34 and the microphone 24. The graphical display interface 20 is refreshed from a frame memory (frame mem) 48 as controlled by a user interface/display chip 50, which may process signals to and from the display interface 20 and/or additionally process user inputs from the keypad 22 and elsewhere.

Certain exemplary embodiments of the UE 10 may also include one or more secondary radios such as a wireless local area network radio (WLAN) 37 and/or a Bluetooth® radio (BT) 39, which may incorporate one or more on-chip antennas or be coupled to one or more off-chip antennas. Throughout the UE 10 are various memories, such as a random access memory (RAM) 43, a read only memory (ROM) 45, and, in some exemplary embodiments, a removable memory such as the illustrated memory card 47. In some exemplary embodiments, the various programs 10C are stored on the memory card 47. The components within the UE 10 may be powered by a portable power supply such as a battery 49.

The aforesaid processors 38, 40, 42, 44, 46, 50, if embodied as separate entities in the UE 10 or the eNB 12, may operate in a master-slave relationship with respect to the main/master processor 10A, 12A. Exemplary embodiments of this invention need not be disposed in a central location, but may instead be disposed across various chips and memories as shown or disposed within another processor that combines some of the functions described above for FIG. 2B. Any or all of these various processors of FIG. 2B may access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which, in some exemplary embodiments, may include an array of tower-mounted antennas rather than the antennas 36 shown in FIG. 2B.

Note that the various processors and/or chips (e.g., 38, 40, 42, etc.) described above may be combined into a fewer number of such processors and/or chips and, in a most compact case, may be embodied physically within a single processor or chip.

While described above in reference to memories, these components may generally be seen to correspond to one or more storage devices, storage circuits, storage components and/or storage blocks. In some exemplary embodiments, these components may comprise one or more computer-readable mediums (e.g., non-transitory), one or more computer-readable memories (e.g., computer readable storage memories) and/or one or more program storage devices.

While described above in reference to processors, these components may generally be seen to correspond to one or more processors, data processors, processing devices, processing components, processing blocks, circuits, circuit devices, circuit components, circuit blocks, integrated circuits and/or chips (e.g., chips comprising one or more circuits or integrated circuits).

Below are considered a number of different exemplary approaches and aspects of the exemplary embodiments of the invention. The different exemplary elements discussed below may be utilized separately and/or together. That is, the exemplary embodiments of the invention, such as those described below, may be implemented, practiced or utilized in any combination (e.g., any combination that is suitable, practicable and/or feasible) and are not limited only to those particular exemplary combinations described below.

First Approach

Figure 6:
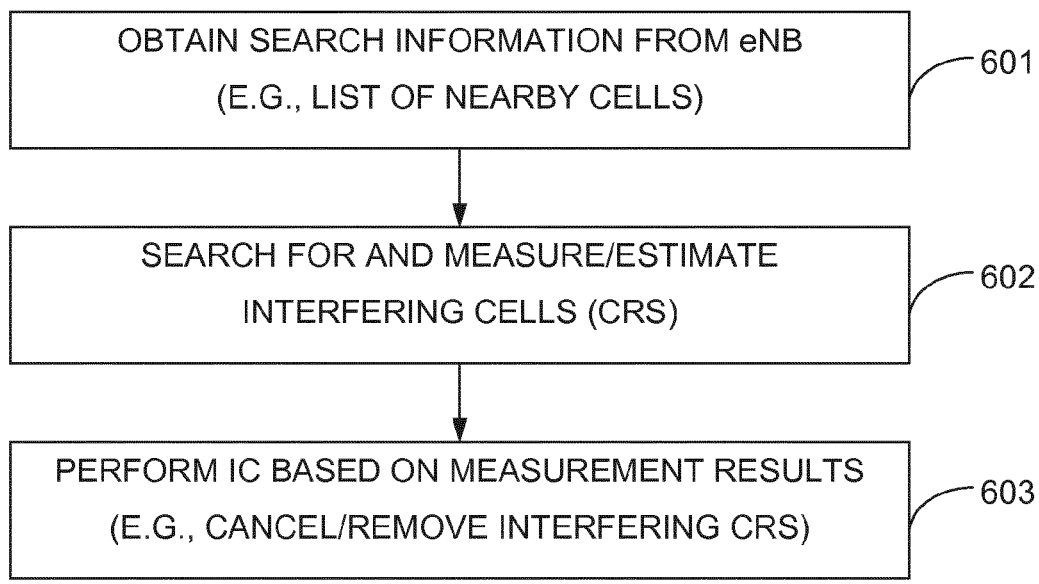
FIG. 6 depicts a flowchart illustrating one non-limiting example of a method, and execution of one or more computer programs, for practicing the exemplary embodiments of the invention.

The UE may implement an exemplary IC scheme as illustrated in FIG. 6. FIG. 6 depicts a flowchart illustrating one non-limiting example of a method, and execution of one or more computer programs, for practicing the exemplary embodiments of the invention. The UE obtains search information from the eNB (601). The UE uses the search information to search for and measure/estimate potentially interfering cells (602). The UE uses the measurement results to perform IC by canceling and/or removing the CRS from interfering cells (603).

In some exemplary embodiments, the search information comprises a list of nearby cells that are known to the eNB. For example, the search information may be represented as a list of cell IDs (e.g., PCI) for nearby cells. In some exemplary embodiments, the list of cell IDs may be ordered, for example, in a suggested order for measuring the identified cells (e.g., the CRS of the identified cells).

Regardless of whether or not the list is ordered, the list of cell IDs helps the UE to optimize the search strategy. For example, if the UE did not have such a list of cell IDs then the UE would need to use the primary/secondary synchronization channel(s) and CRS associated with all 504 cell IDs as defined in the LTE specification to blindly search for interfering cells. In some exemplary embodiments, this blind search can be avoided by utilizing a history of interfering cells, for example, from the recent past. In such a manner, a more informed search strategy (e.g., search schedule) can be exploited similar to the UE receiving search information from the access node/eNB.

Although the search information (e.g., list of cell IDs) may provide the UE with enough information to cancel/remove the CRS of the identified cells, it is still desirable for the UE to search for and measure/estimate the identified cells. This is because not every cell in the list may be interfering with the UE's communication (communication from and/or to the UE's current access node/eNB) or may not have a significant effect on the UE. In such a case, trying to cancel a non-interfering CRS or weak interference may lead to worse SNR/SINR due to inaccuracy in the channel estimation.

Second Approach

Figure 7A:
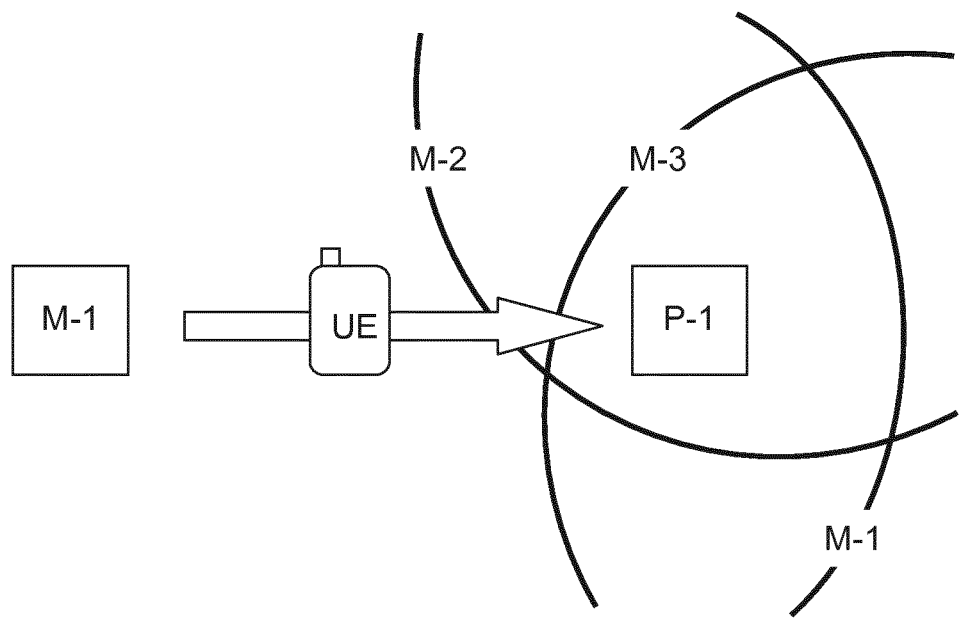
FIGS. 7A and 7B depict two exemplary illustrations of systems showing interference for a UE under a picocell.
Figure 7B:
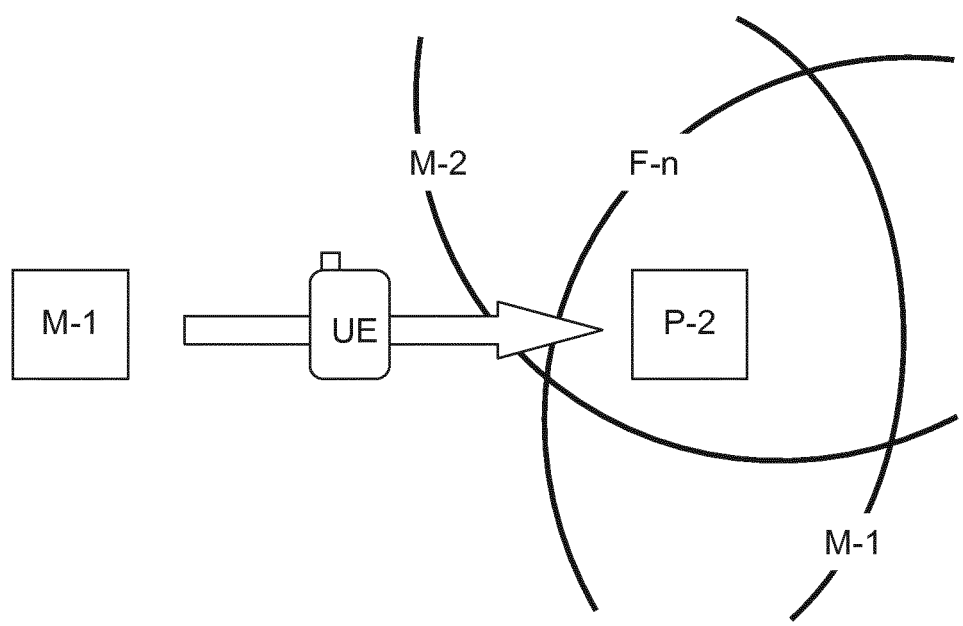

Consider the following two situations that are shown in FIGS. 7A and 7B. In FIG. 7A, a UE moves from a first macrocell (M-1) to a picocell (P-1). Assume that P-1 has three nearby macrocells: M-1, M-2 and M-3. It is safely assumed that M-1 has knowledge of the other nearby macrocells M-2 and M-3. Thus, M-1, which the UE performed the attachment procedure on, can have the cell IDs of M-2 and M-3 in the broadcast message (e.g., SIBx message), the handover message or both. While the UE would still need to check if M-2 and/or M-3 pose interference to the signal received at the UE from P-1, the UE would have a solid starting position (e.g., via search information).

FIG. 7B illustrates a similar arrangement to that of FIG. 7A except now the picocell (P-2) has two nearby macrocells, M-1 and M-2, and a number of femtocells F-n. In this case, it may not be possible for M-1 to list the cell IDs of the F-n in a broadcast and/or handover message, for example, because there may be too many of them under its coverage area. Furthermore, the P-2 may have one or more femtocells under its coverage area that do not fall under the M-1 coverage area (e.g., different interfering signals).

In view of the above-noted example, it becomes clear that relying on search information from the access node/eNB may be insufficient for determining the presence of interfering cells. As such, it may be desirable to use a different exemplary technique or to supplement the first approach with another exemplary technique.

Figure 8:
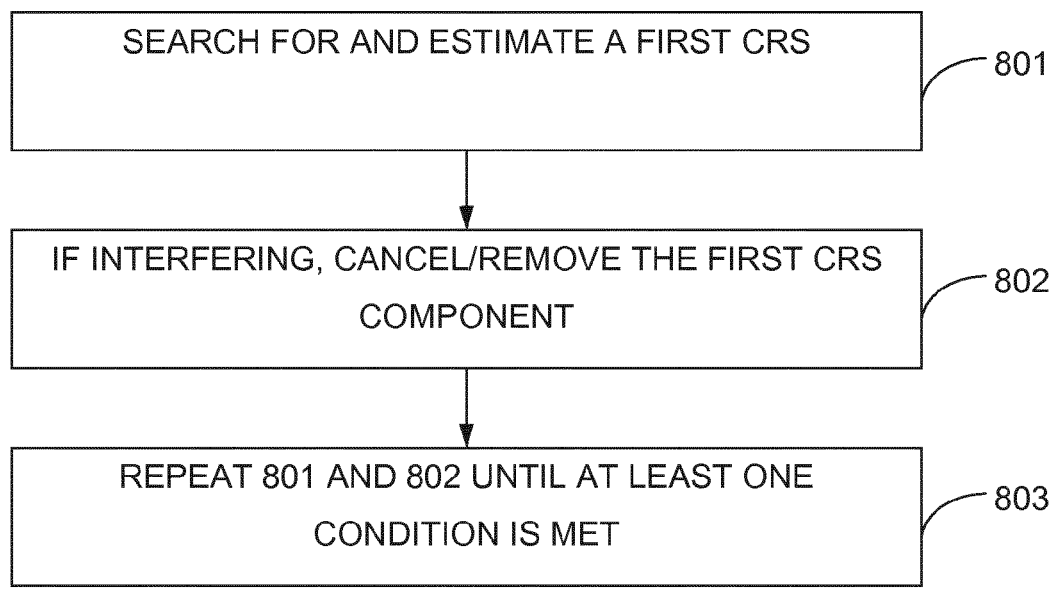
FIG. 8 depicts a flowchart illustrating another non-limiting example of a method, and execution of one or more computer programs, for practicing the exemplary embodiments of the invention.

Thus, the UE may implement another exemplary IC scheme as illustrated in FIG. 8. FIG. 8 depicts a flowchart illustrating one non-limiting example of a method, and execution of one or more computer programs, for practicing the exemplary embodiments of the invention. The UE searches for and estimates a first CRS (801). If the first CRS is interfering (or interfering enough so as to cause a problem, for example, based on one or more criteria, such as SNR/SINR), the UE cancels/removes the first CRS component from the received signal (i.e., the signal received from its current access node/eNB, e.g., from the picocell) (802). Repeat steps 801 and 802 for additional CRS that may be interfering, canceling/removing those that are determined to be interfering (803). The iteration of steps may continue until at least one condition is met. In this manner, it is as though the UE is peeling away layers of an onion, iteratively improving the signal received from its current access node/eNB.

As a non-limiting example, the iteration may stop when the channel estimate for the detected cell is not accurate enough (e.g., based on the estimated SNR/SINR). As another non-limiting example, the iteration may stop based on reaching/canceling a certain number of interfering signals/cells (e.g., four interfering signals). As a further non-limiting example, the iteration may stop based on an estimated quality (e.g., SNR/SINR) of the signal received from its current access node/eNB (e.g., until the received signal is good enough based on an estimated signal to interference plus noise ratio, until enough interference has been canceled/removed such that SNR/SINR is within an acceptable range).

Additional Elements

Consider a case where the cell ID of an interfering cell, as found/discovered by search and estimation, is not on a received cell ID list (search information). In some exemplary embodiments, the UE may inform an eNB (e.g., a macrocell eNB) of this interfering cell. In further exemplary embodiments, the UE may include location information (e.g., for the UE's position as determined by a positioning technique). In such a manner, the eNB may be able to build a database of interfering cells at a frequency for a certain location. In the future, when this or another UE operates around that location, the finely-tuned cell ID list can be more accurate and enable a more efficient search schedule.

Typically, once the UE is in the RRC-connected mode, the serving cell can schedule DL/UL transmissions in any subframe. This translates into a requirement for the UE to continuously monitor the PDCCH, PHICH and PCFICH from the serving cell, for example. If the UE identifies the top interference cells correctly and the interference signals are subtracted from the received signals, communication will proceed in an efficient manner.

Now suppose the UE is moving. Sooner or later, a previously-unknown or unaccounted for interfering cell will appear and cause interference. In addition or instead, the rankings of the known interfering signals may change due to the UE's movement. In these cases, it is useful to enable the UE to adapt to the new situation(s). As an example, dedicated synchronization/CRS correlators can be used for searching the cell IDs. However, such an implementation is not desirable since it is better to reduce hardware and software requirements, for example, by reusing existing circuit/receiver engine(s) and architecture. As such, it may be preferable to allow the UE to freely adjust the AGC (gain control) setting so that it has freedom to search for new cells and/or adjust cell rankings.

During these adjustments, the interference cancellation circuitry can be temporarily turned off so that operations are performed at the digital baseband. This removes any undesirable calibration work. When the UE is operating in such a manner for a subframe (i.e., adjusting gain control), the UE will not be able to decode the PDCCH (for example, a macrocell generates lots of interference, now the gain control is adjusted so that the signal after ADC is not saturated, then the PDCCH for the serving cell may not have enough bits for correct decoding). To maintain effective communication with the serving cell, in some exemplary embodiments the eNB provides the UE with one or more opportunities for adjusting gain control (e.g., the eNB schedules the UE to perform gain adjustment, for example, by having the UE measure cells, perform search and estimation, obtain new/updated search information, etc.).

During normal operation of the interference cancellation, there may exist a carrier frequency offset between the CRS from the interfering cell and the UE. In this case, the estimated channel response for the interfering CRS in the initial measurement opportunity will be close to the real channel response for the interfering CRS; and gradually the difference will become larger (e.g., rendering the IC less effective as the difference increases, for example, due to phase rotation). To effectively deal with this problem, in some exemplary embodiments the channel response for the residual interfering CRS from the baseband signal (after IC) is obtained in the digital domain and made available to the IC circuitry. For example, the interfering CRS existing in the baseband signal going through IC can be estimated and added to the IC circuitry for the next subframe, thus extending the duration of acceptable performance (e.g., extending the time between updates). In this way, the effect of carrier offset can be dealt with.

The UE can measure the CRS channel response when an opportunity for UE measurement is determined, provided and/or established (e.g., per instructions received from the serving access node/eNB).

As an example, the updating/adjustment of AGC is performed in order to give the UE a chance for a fresh start on the channel estimates for interfering CRS. As such, a relatively high frequency for performance of the updating/adjustment may be desired. However, as noted above while updating/adjustment of AGC is performed, DL traffic may be prohibited. Thus, there is a balance that must be struck between the desire to update/adjust gain control and the desire not to interfere with DL communication. This balance is directly reflected in the frequency of performing updates/adjustments. In some exemplary embodiments, the frequency may be known a priori (e.g., established in advance, for example, by a communication standard or known condition). In further exemplary embodiments, the serving access point (eNB) may modify the frequency on the fly or trigger the frequency based on something (e.g., in response to at least one condition or criteria, such as SNR/SINR of the CRS for the serving cell; in response to a time period since a particular activity such as connection to the serving cell).

In one exemplary embodiment, the estimation can be obtained through the common receiver chain for the serving cell or an interfering cell:

1. Receive a baseband signal from the ADC with each receive antenna.
2. Remove cyclic prefix from the received signal(s).
3. Subtract known CRS signals for other cells from the signal(s) resulting from step 2.
4. Perform FFT.
5. Perform channel estimation for the cell of interest.

The above procedure gives an example of cancelling interfering signals in the time domain and successively estimating the channel responses of interfering signals and the desired signal in the frequency domain. One of ordinary skill in the art will recognize that the interference can occur in the time and/or frequency domains, and channel estimation can be performed in the time and/or frequency domains, and, thus, varieties of combinations within or between the steps are available for use.

The known CRS signals of step 3 can be obtained or made available to the UE in any suitable manner. For example, the serving cell of the UE can signal a list of cell IDs for the macro cell(s) to the UE for performing CRS interference cancellation. As another example, the cell IDs for macro cells can be found by the UE through the cell search procedure. These two exemplary techniques can be complementary to one another. For example, if the interfering cells are femto cells, then typically there is no X2 link (for inter-eNB communication) between the pico UE's serving cell and the femto cell(s). In such a case, the UE may have to rely on the cell search procedure to acquire the interfering cells' cell IDs. As another example, if the UE is associated with a femto cell and the interfering cell also is a femto cell, the UE similarly may have to rely on the cell search procedure to acquire the interfering cells' cell IDs.

In another exemplary embodiment, the estimation can be obtained with a correlator before the ADC. In some exemplary embodiments, a tracking loop is used so that the previous measurements are exploited when estimating the current channel response. In further exemplary embodiments, SIC may be used in the analog domain.

As an example, iterative interference cancellation for SIC may proceed according to the following steps:

1. Estimate the CRS1 channel.
2. Cancel the CRS1 component in the analog signal and estimate the CRS2 channel.
3. Cancel the CRS2 component in the analog signal and estimate the next CRS channel.
4 Repeat steps 2 & 3, logging the channel estimates for successive CRS components/channels.
5. Report the results (e.g., send a report to the eNB). (optional)

The serving cell (e.g., picocell) eNB may signal the UE in the DL to inform the UE of CRS channel measurement opportunities. The serving cell eNB may perform this even if the macro cell is not included in the neighbor list or other handoff measurement(s). The eNB may signal the UE concerning various measurement opportunities under a variety of circumstances. For example, the UE may be instructed to measure the CRS channel response of a dominant interfering sector during non-ABS subframes. As another example, the UE may be instructed to measure the CRS channel response during specially reserved measurement opportunities.

One cannot assume that the UE can always monitor the interfering CRS in the digital domain. The ADC has to be adjusted and the UE may not have enough bits. The eNB should provide the UE with an opportunity to adjust the ADC. Currently, the ADC is maintained with several bits by the UE and is adjusted to obtain the strongest signal possible (to reduce the contribution from quantization error). In view of the HetNet, the UE will now need to attach to the second or third strongest signal, for example (e.g., a pico cell). Interference control is necessary to mitigate the effect of the first or second strongest signal(s), for example. Thus, the UE can track the gain in the analog domain prior to ADC. In addition, by not using a high bit ADC the UE can conserve power.

Since the eNB schedules the UE and informs the UE of this scheduling to perform adjustments, the eNB may schedule the UE based on various considerations. For example, if the UE was handed-over from a macrocell, the serving cell (e.g., picocell) knows that the macrocell may be a source of interference. As such, the serving cell can configure the UE based on knowledge of the macrocell's performance and/or scheduling. In other exemplary embodiments, the serving cell can schedule/configure the UE blindly. Depending on the mobility of the UE (e.g., which can be deduced from RSRP measurements from the UE), the eNB can configure more opportunities to address such updates and adjustments.

In the normal operation of receiving signals from the pico cell in the presence of strong macro cell interference, the CRS waveforms from the interfering cell(s) can be generated, gain-adjusted and added to the incoming analog baseband signal. The locally generated CRS waveforms will cancel most of the incoming CRS interference and the same dynamical range/bit width as in a Rel-8/9 UE receiver can be used in a Rel-10/11 UE receiver. The gain can be from a previous subframe(s) or previous symbols in a subframe.

The CRS waveform is determined by two parameters: cell ID (PCI) and slot number index. If one assumes usage of a synchronized network where the slot number index is shared among all cells, the PCI uniquely determines the CRS waveform, although it should be noted that the timing difference among different cells due to propagation delay will be determined from cell search/channel estimation. The synchronization channel is also uniquely determined by PCI. Thus, once a cell ID list is provided to the UE, the UE can construct the corresponding CRS waveform. In an un-synchronized network, there can be timing differences between cells. For example, cell 1 can be offset with respect to cell 2 by one slot, several OFDM symbols, or a fractional OFDM symbol, as non-limiting examples. In this case, the timing difference among cells can be acquired from the signaling from the eNBs, searched from the UE or both, in a fashion similar to how the cell ID of an interfering cell is acquired. Further, the cyclic prefix used in each cell can also be different and also can be acquired in a similar manner.

The interference cancellation circuit can be turned off for power saving. For example, the feedback from UE measurement can be used to turn off interference cancellation when the UE does not detect strong CRS interference.

Figure 3:
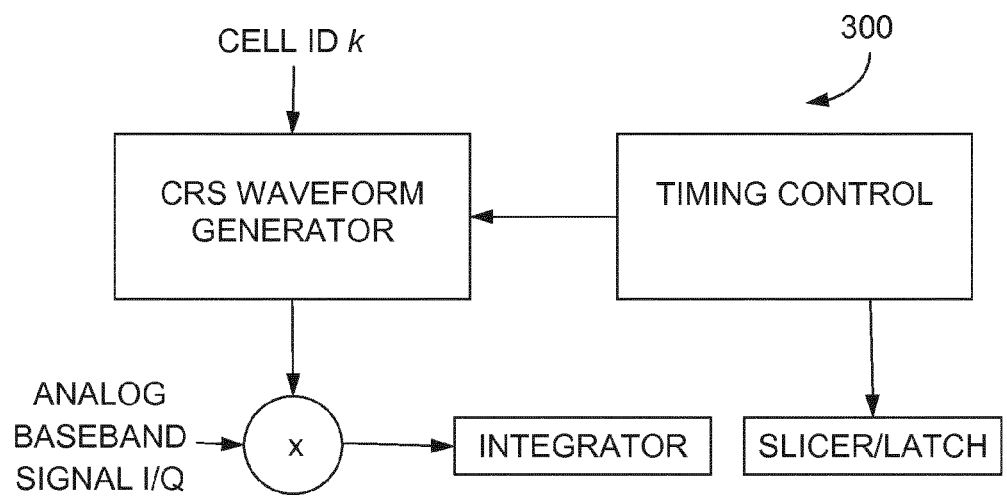
FIG. 3 illustrates an exemplary apparatus for a UE to perform channel estimation for an interfering CRS signal.

FIG. 3 illustrates an exemplary apparatus 300 for a UE to perform channel estimation for an interfering CRS signal. As an example, this circuit is turned on (e.g., by the UE) in response to a determination, for example, that without activation of this circuit and an accompanying interference cancellation circuit (see FIG. 4) operation will lead to a low gain setting for the desired signal and, consequently, the desired signal may suffer from excessive quantization noise. This is an analog circuit implementation located in the receiver chain(s) before ADC. The channel response for a dominant interfering cell CRS is obtained for each reception (RX) chain. The channel gain is retained in an analog fashion. An alternative exemplary implementation would be to use a conventional LTE receiver chain to estimate the channel gain for I and Q, and then subsequently use the digital gain to look up an analog gain setting. Such an alternative exemplary implementation can be used in the case where the pico cell UE is given CRS measurement opportunities by the pico cell eNB and, thus, has time to adjust its AGC to measure the high power interference CRS signal with the interference cancellation circuit turned off. The pico cell UE can then keep/update the channel estimates for the interfering CRS and turn on the interference cancellation circuit, adjusting the AGC to boost the signal level of the desired signal. In some exemplary embodiments, subsequent to the components/operations shown in FIG. 3, one would have at least one filter, at least one amplifier and/or at least one ADC. The components/operations depicted in the apparatus 300 of FIG. 3 remove the gain of the CRS interfering signal in the analog domain.

Figure 4:
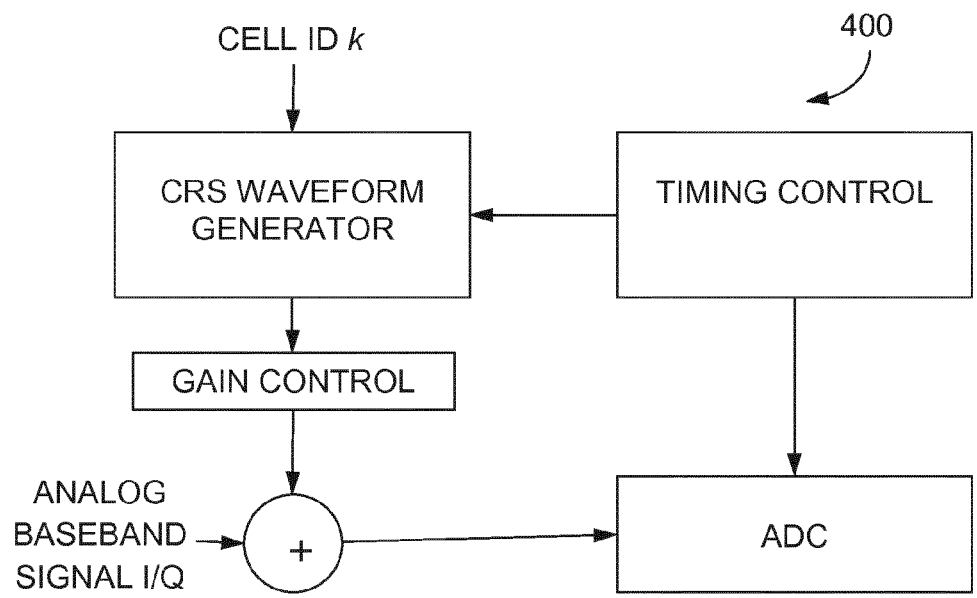
FIG. 4 depicts another exemplary apparatus useful for CRS interference cancellation at a UE.
Figure 5A:
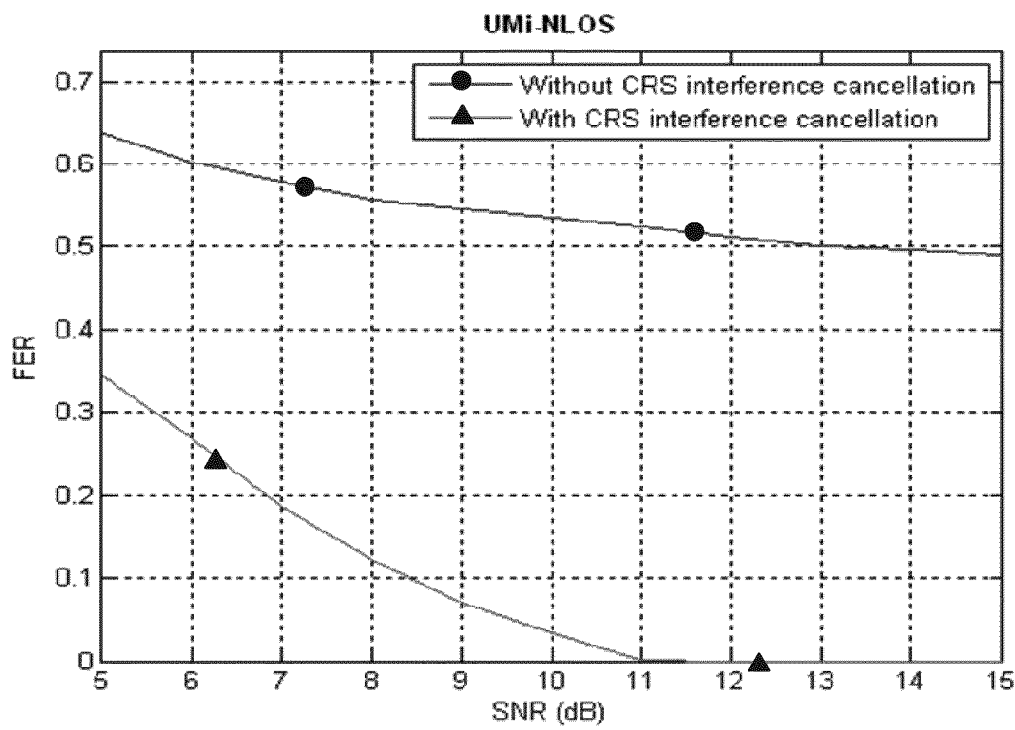
FIGS. 5A-5E show exemplary simulation data comparing FER to SNR for data with and without CRS interference cancellation.
Figure 5B:
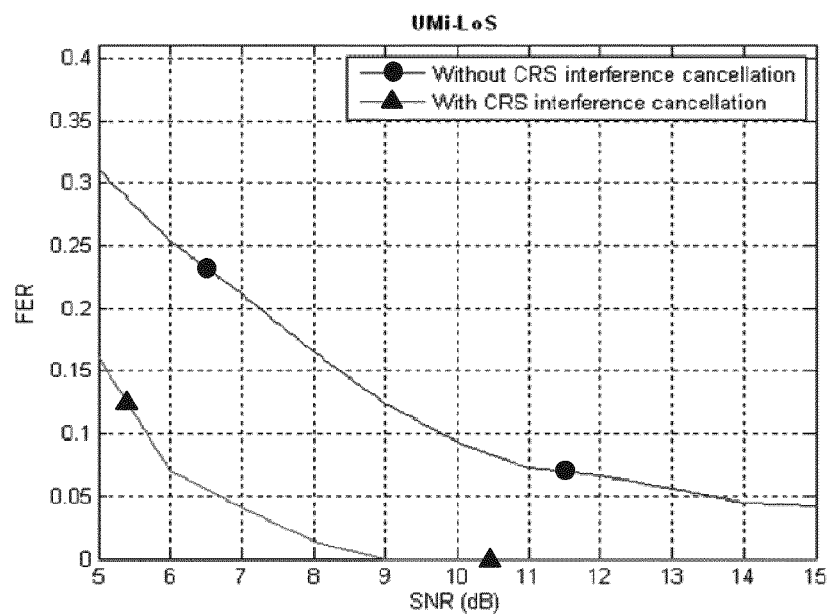
Figure 5C:
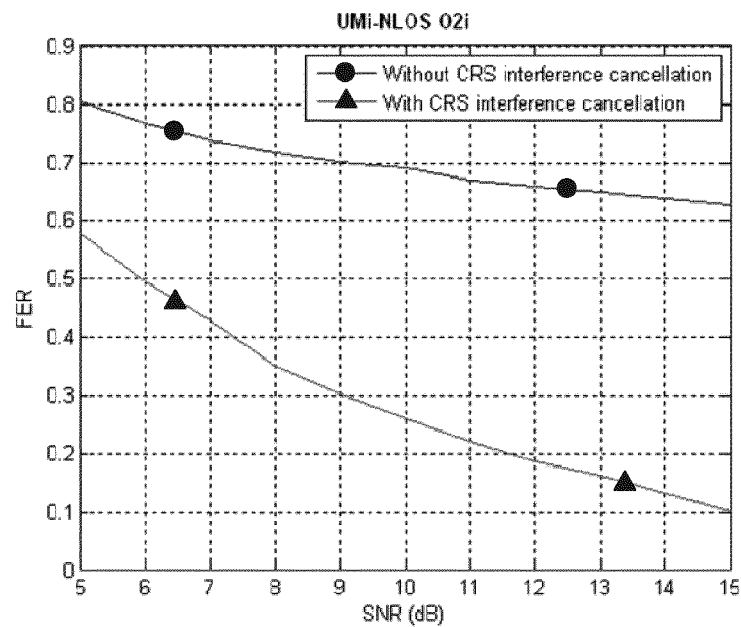
Figure 5D:
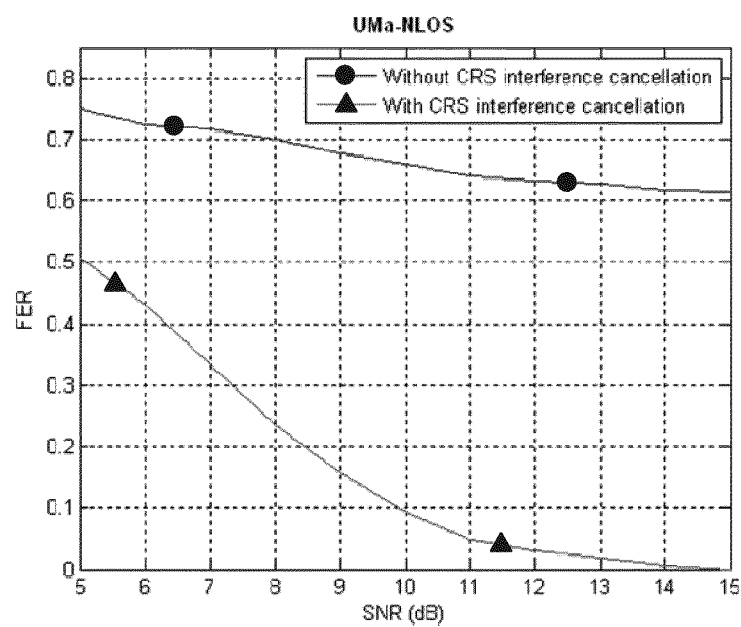
Figure 5E:
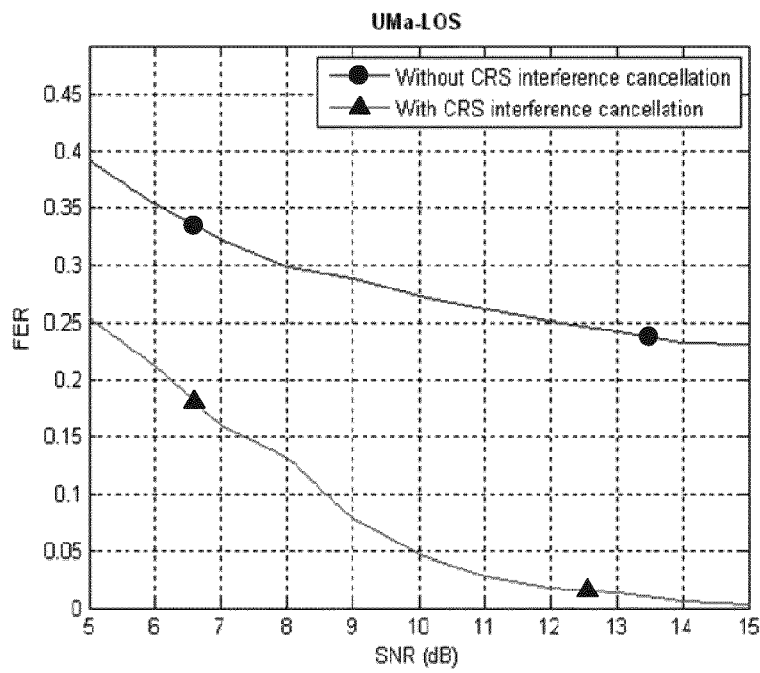

FIG. 4 illustrates another exemplary apparatus 400 useful for CRS interference cancellation at a UE. The apparatus 400 of FIG. 4 shows how the locally-generated interfering CRS signals are gain-adjusted and added to the incoming signals from the I/Q demodulators (not shown), by controlling the timing, gain and polarity of the locally-generated CRS interference signal(s). In such a manner, the CRS interference in the incoming signal is removed and/or mitigated (e.g., substantially mitigated, substantially removed), and, as a consequence, the dynamic range of the signals at the input(s) of ADC is much lower than the dynamic range of the signals from the I/Q demodulators.

In both apparatus 300, 400 of FIGS. 3 and 4, power control is provided by the CRS waveform generator and/or gain control block.

If a conventional solution were used, a UE would always need to have a high resolution ADC and the power consumption would be high, even for a UE not in the cell range extension area (e.g., even for a CCU). A receive device without AC power will have a short battery life and this would severely limit the number of UEs supporting eICIC, thus negating any system performance gain from eICIC. In contrast, using exemplary embodiments of the invention, the circuit for interference cancellation may turn on only when the UE is performing CRE. Consequently it is more power efficient.

A number of simulations were performed to evaluate CRS interference cancellation performance with application of the exemplary embodiments of the invention. FIGS. 5A-5E show exemplary simulation data comparing FER to SNR for data with and without CRS interference cancellation. Note that the symbols in these figures (the circles and triangles) do not represent actual data points but instead are used merely for identification purposes. ITU spatial channel models were used: UMI-LoS, UMI-NLoS, UMA-LoS, UMA-NLoS. The CRS interference was assumed to be 5 dB higher than the desired signal and the ABS pattern was applied at the macro eNB within a synchronized network. As can be seen from the simulated data shown in FIGS. 5A-5E, use of the exemplary CRS interference cancellation scheme resulted in a lower FER.

Figure 9:
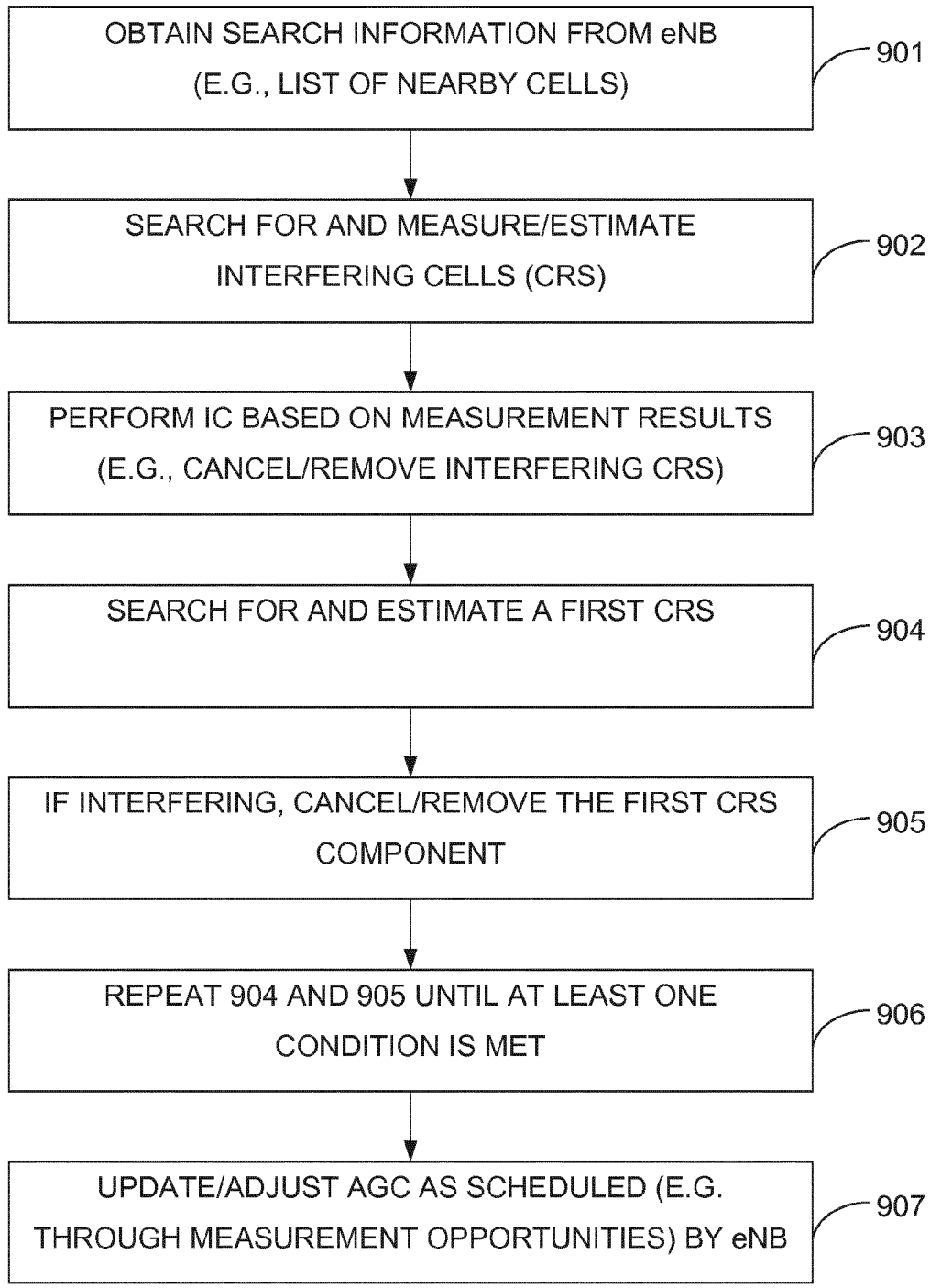
FIG. 9 depicts a flowchart illustrating another non-limiting example of a method, and execution of one or more computer programs, for practicing the exemplary embodiments of the invention.

FIG. 9 depicts a flowchart illustrating another non-limiting example of a method, and execution of one or more computer programs, for practicing the exemplary embodiments of the invention. The exemplary method includes: obtaining search information from an access point (e.g., access node, eNB, macro eNB) (901); searching for and measuring/estimating at least one (one or more) interfering cells (e.g., by searching for and measuring CRS from the at least one interfering cell) (902); performing IC based on the measurement results (e.g., to cancel/remove the interfering CRS) (903); searching for and estimating a first CRS (e.g., that is different from the previous CRS) (904); if interfering (e.g., in response to determining that the first CRS constitutes an interfering signal, for example, by the measurement/estimation of the first CRS meeting at least one criteria or condition, such as being interfering enough (e.g., strong enough, SNR/SINR effect)), cancel/remove the first CRS component (905); repeating steps 904 and 905 for additional CRS components (e.g., at least one additional CRS, at least one additional interfering CRS) (906); and updating/adjusting AGC as scheduled by the access point (907).

Regarding block 907, as shown in the example of FIG. 4 and described above, the incoming signal, which contains interfering CRS signals, is added with a locally generated copy of the interfering CRS signals (e.g., interference cancellation in the analog domain), so the ADC's gain is set to receive the desired signal only. As the gains of the interfering CRS signals are different, one way to set the ADC's gain appropriately is to build a correlator and estimate the gains of interfering CRS signals in an analog fashion as shown at least in part in FIG. 3. As described above, the UE needs to periodically change the gain setting for ADC so the UE can track/identify interfering CRS signals. As also described above, during the time the UE is changing the setting for the ADC, the UE generally cannot receive certain or any signals (e.g., PDCCH) from its serving cell, which can potentially leads to problems. The eNB needs to provide measurement opportunities for gain setting to the UE. In block 907, the eNB provides such measurement opportunities to the UE and the UE performs measurements for gain setting in these opportunities.

In some exemplary embodiments, steps 902 and 903 are repeated for additional CRS components (e.g., at least one additional CRS, at least one additional interfering CRS), for example, until at least one criteria or condition is met. In further exemplary embodiments, IC is performed in response to a determination that the interfering signal meets at least one criteria or condition, such as being interfering enough (e.g., strong enough, SNR/SINR effect), as a non-limiting example. In some exemplary embodiments, step 904 refers to a UE performing an autonomous search that is not based on the obtained search information. In this manner, the UE can detect and respond to interfering signals that are not identified in the search information. In some exemplary embodiments, steps 904-906 and/or 904-907 are optional, for example, based on an estimate of the serving cell's CRS (e.g., SNR/SINR, strength, etc.). In further exemplary embodiments, step 907 is optional.

Below are provided further descriptions of various non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein.

Figure 10:
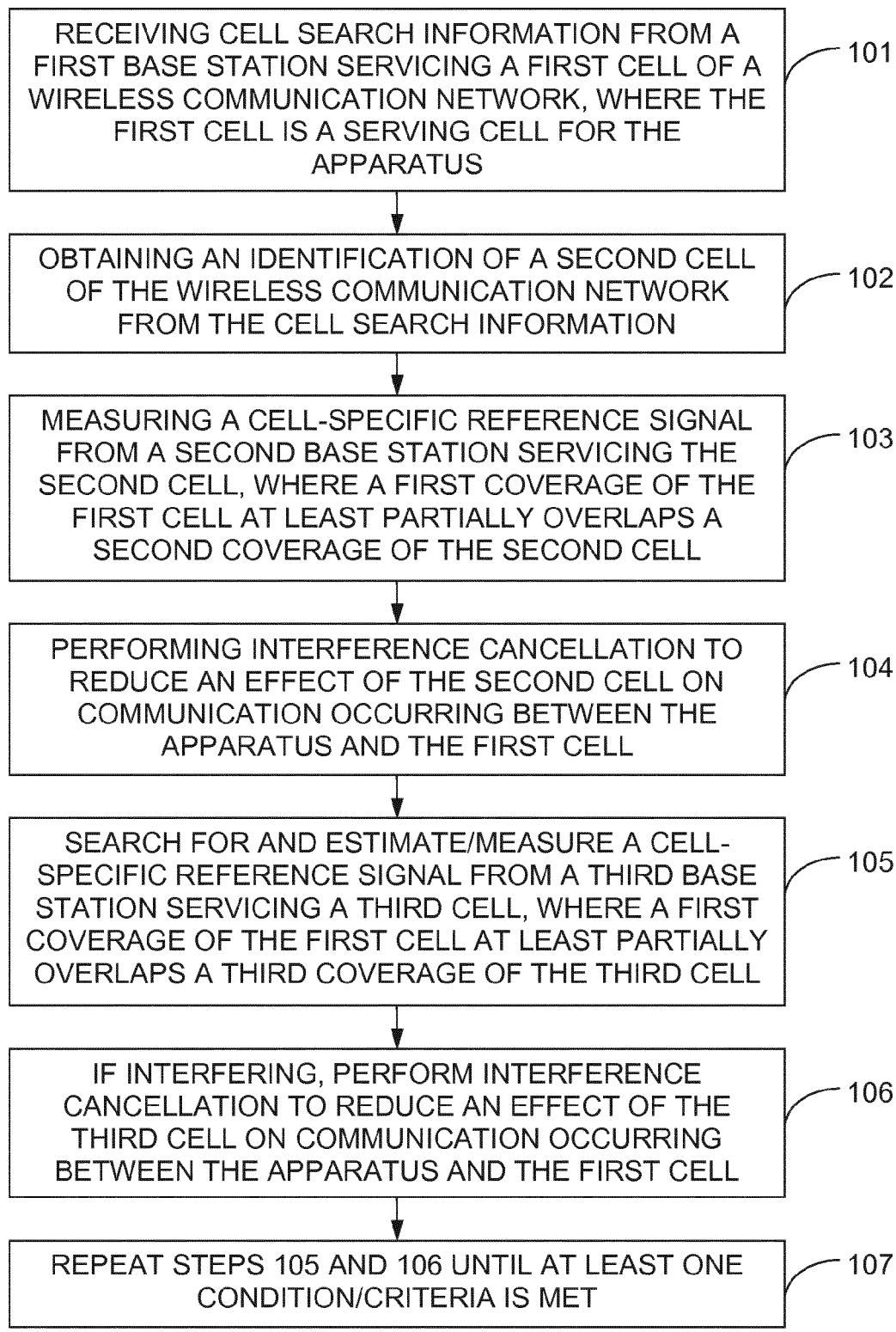
FIG. 10 depicts a flowchart illustrating another non-limiting example of a method, and execution of one or more computer programs, for practicing the exemplary embodiments of the invention.

(1) In one exemplary embodiment of the invention, and with reference to FIG. 10, a method comprising: receiving (e.g., by an apparatus, such as a mobile device, mobile node, mobile phone) cell search information from a first base station servicing a first cell of a wireless communication network, where the first cell is a serving cell for the apparatus (101); obtaining (e.g., by the apparatus) an identification of a second cell of the wireless communication network from the cell search information (102); measuring (e.g., by the apparatus) a cell-specific reference signal from a second base station servicing the second cell, where a first coverage of the first cell at least partially overlaps a second coverage of the second cell (103); and performing interference cancellation (e.g., by the apparatus) to reduce an effect of the second cell on communication occurring between the apparatus and the first cell (104).

A method as above, where the cell search information comprises cell IDs, timing information, and cyclic prefixes. A method as in any above, where the cell search information comprises a list of cell IDs, timing information and cyclic prefixes for cells in a joint coverage area. A method as in any above, where the interference cancellation is performed in response to determining (e.g., by the apparatus) (e.g., based on the measured cell-specific reference signal) that the cell-specific reference signal of the second cell interferes with communication occurring with the first cell (e.g., between the apparatus and the first cell).

A method as in any above, further comprising: searching for and estimating/measuring a cell-specific reference signal from a third base station servicing a third cell, where a first coverage of the first cell at least partially overlaps a third coverage of the third cell (105); and if interfering, performing interference cancellation to reduce an effect of the third cell on communication occurring between the apparatus and the first cell (106). A method as in any above, further comprising: repeating steps 105 and 106 (e.g., for one or more additional cell-specific reference signals from one or more additional cells having a coverage that at least partially overlaps with the first coverage of the first cell) until at least one condition/criteria is met (107).

In some exemplary embodiments of the invention, step 102 may be included with step 103, for example, to read: measuring (e.g., by the apparatus) a cell-specific reference signal from a second base station servicing a second cell, where a first coverage of the first cell at least partially overlaps a second coverage of the second cell, where an identification of the second base station is obtained (e.g., derived, read) from the received cell search information.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A method as in any above, further comprising one or more aspects of the exemplary embodiments of the invention as described herein.

(2) In another exemplary embodiment of the invention, a program storage device (e.g., a computer-readable medium, a non-transitory computer-readable medium, a computer-readable storage medium, a computer-readable storage device) readable by a machine (e.g., at least one apparatus, at least one processor), tangibly embodying (e.g., storing) a program of instructions executable by the machine (e.g., at least one computer program) for performing operations, said operations comprising: receiving (e.g., by an apparatus, such as a mobile device, mobile node, mobile phone) cell search information from a first base station servicing a first cell of a wireless communication network, where the first cell is a serving cell for the apparatus (101); obtaining (e.g., by the apparatus) an identification of a second cell of the wireless communication network from the cell search information (102); measuring (e.g., by the apparatus) a cell-specific reference signal from a second base station servicing the second cell, where a first coverage of the first cell at least partially overlaps a second coverage of the second cell (103); and performing interference cancellation (e.g., by the apparatus) to reduce an effect of the second cell on communication occurring between the apparatus and the first cell (104).

A program storage device as in any above, the operations further comprising: searching for and estimating/measuring a cell-specific reference signal from a third base station servicing a third cell, where a first coverage of the first cell at least partially overlaps a third coverage of the third cell (105); and if interfering, performing interference cancellation to reduce an effect of the third cell on communication occurring between the apparatus and the first cell (106). A program storage device as in any above, the operations further comprising: repeating steps 105 and 106 (e.g., for one or more additional cell-specific reference signals from one or more additional cells having a coverage that at least partially overlaps with the first coverage of the first cell) until at least one condition/criteria is met (107).

A program storage device as in any above, wherein the program storage device comprises at least one computer-readable medium, at least one non-transitory computer-readable medium, at least one computer-readable storage medium, at least one computer-readable memory, at least one memory, at least one memory card, at least one removable memory, at least one storage device, at least one storage component and/or at least one storage circuit. A program storage device as in any above, further comprising one or more aspects of the exemplary embodiments of the invention as described herein.

(3) In a further exemplary embodiment of the invention, an apparatus comprising: at least one processor; and at least one memory including computer program code, the at least one memory and the computer program code being configured to, with the at least one processor, cause the apparatus at least to perform: receive cell search information from a first base station servicing a first cell of a wireless communication network, where the first cell is a serving cell for the apparatus; obtain an identification of a second cell of the wireless communication network from the cell search information; measure a cell-specific reference signal from a second base station servicing the second cell, where a first coverage of the first cell at least partially overlaps a second coverage of the second cell; and perform interference cancellation to reduce an effect of the second cell on communication occurring between the apparatus and the first cell.

An apparatus as in any above, where the at least one memory and the computer program code are configured to, with the at least one processor, cause the apparatus at least to further perform: search for and estimate/measure a cell-specific reference signal from a third base station servicing a third cell, where a first coverage of the first cell at least partially overlaps a third coverage of the third cell; and if interfering, perform interference cancellation to reduce an effect of the third cell on communication occurring between the apparatus and the first cell. An apparatus as in any above, where the at least one memory and the computer program code are configured to, with the at least one processor, cause the apparatus at least to further perform: repeat the operations of searching/estimating/measuring and performing interference cancellation (e.g., for one or more additional cell-specific reference signals from one or more additional cells having a coverage that at least partially overlaps with the first coverage of the first cell) until at least one condition/criteria is met. An apparatus as in any above, where the apparatus comprises a mobile device, a mobile node, a portable device, a mobile phone or a cellular phone. An apparatus as in any above, further comprising one or more aspects of the exemplary embodiments of the invention as described herein.

(4) In another exemplary embodiment of the invention, an apparatus comprising: means for receiving (e.g., at least one receiver, at least one antenna, at least one transceiver) cell search information from a first base station servicing a first cell of a wireless communication network, where the first cell is a serving cell for the apparatus; means for obtaining (e.g., at least one processor, at least one circuit, at least one hardware component, at least one chip, at least one function block) an identification of a second cell of the wireless communication network from the cell search information; means for measuring (e.g., at least one processor, at least one circuit, at least one hardware component, at least one chip, at least one function block) a cell-specific reference signal from a second base station servicing the second cell, where a first coverage of the first cell at least partially overlaps a second coverage of the second cell; and means for performing interference cancellation (e.g., at least one processor, at least one circuit, at least one hardware component, at least one chip, at least one function block) to reduce an effect of the second cell on communication occurring between the apparatus and the first cell.

An apparatus as in any above, further comprising: means for searching for and estimating/measuring (e.g., at least one receiver, at least one antenna, at least one transceiver, at least one processor, at least one circuit, at least one hardware component, at least one chip, at least one function block) a cell-specific reference signal from a third base station servicing a third cell, where a first coverage of the first cell at least partially overlaps a third coverage of the third cell; and if interfering, means for performing interference cancellation (e.g., at least one processor, at least one circuit, at least one hardware component, at least one chip, at least one function block) to reduce an effect of the third cell on communication occurring between the apparatus and the first cell. An apparatus as in any above, further comprising: means for repeating (e.g., at least one receiver, at least one antenna, at least one transceiver, at least one processor, at least one circuit, at least one hardware component, at least one chip, at least one function block) the operations of searching/estimating/measuring and performing interference cancellation (e.g., for one or more additional cell-specific reference signals from one or more additional cells having a coverage that at least partially overlaps with the first coverage of the first cell) until at least one condition/criteria is met. An apparatus as in any above, where the apparatus comprises a mobile device, a mobile node, a portable device, a mobile phone or a cellular phone. An apparatus as in any above, further comprising one or more aspects of the exemplary embodiments of the invention as described herein.

(5) In a further exemplary embodiment of the invention, an apparatus comprising: reception circuitry configured to receive cell search information from a first base station servicing a first cell of a wireless communication network, where the first cell is a serving cell for the apparatus; identification circuitry configured to obtain an identification of a second cell of the wireless communication network from the cell search information; measurement circuitry configured to measure a cell-specific reference signal from a second base station servicing the second cell, where a first coverage of the first cell at least partially overlaps a second coverage of the second cell; and interference cancellation circuitry configured to perform interference cancellation to reduce an effect of the second cell on communication occurring between the apparatus and the first cell.

An apparatus as in any above, further comprising: search/measurement circuitry configured to search for and estimate/measure a cell-specific reference signal from a third base station servicing a third cell, where a first coverage of the first cell at least partially overlaps a third coverage of the third cell; and interference cancellation circuitry configured to, if interfering, perform interference cancellation to reduce an effect of the third cell on communication occurring between the apparatus and the first cell. An apparatus as in any above, further comprising: repetition circuitry configured to repeat the operations of searching/estimating/measuring and performing interference cancellation (e.g., for one or more additional cell-specific reference signals from one or more additional cells having a coverage that at least partially overlaps with the first coverage of the first cell) until at least one condition/criteria is met. An apparatus as in any above, where the apparatus comprises a mobile device, a mobile node, a portable device, a mobile phone or a cellular phone. An apparatus as in any above, further comprising one or more aspects of the exemplary embodiments of the invention as described herein.

Figure 11:
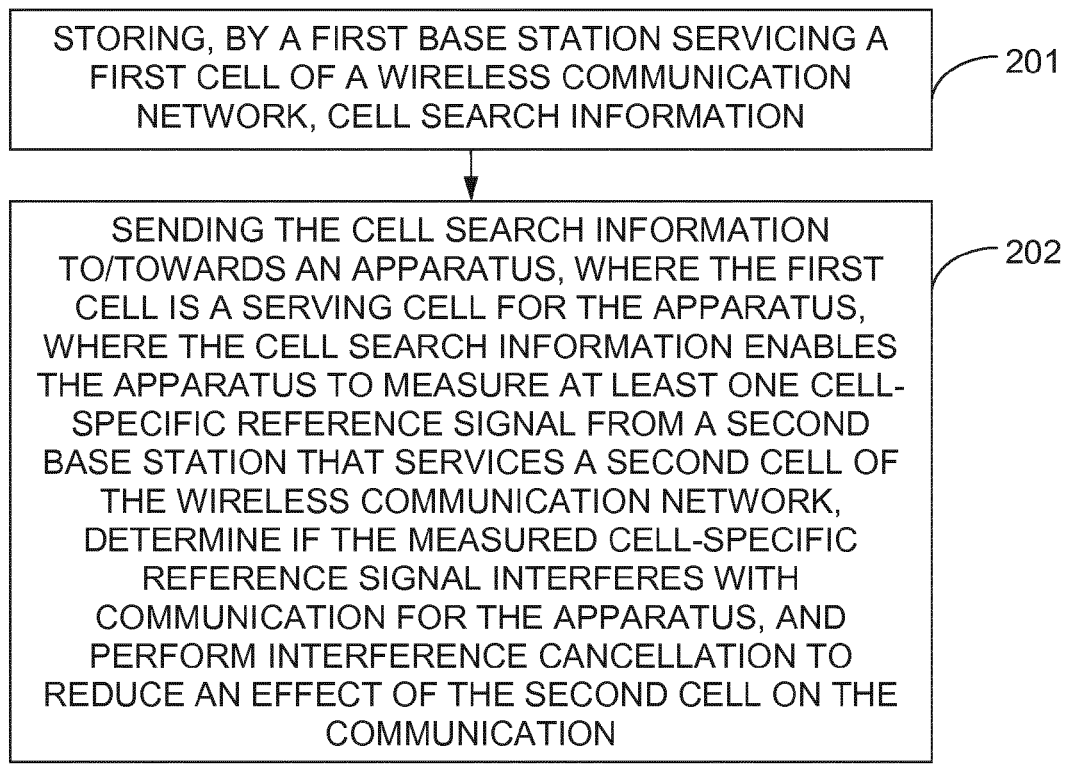
FIG. 11 depicts a flowchart illustrating another non-limiting example of a method, and execution of one or more computer programs, for practicing the exemplary embodiments of the invention.

(6) In another exemplary embodiment of the invention, and with reference to FIG. 11, a method comprising: storing (e.g., on a storage device or component such as at least one memory), by a first base station servicing a first cell of a wireless communication network, cell search information (201); and sending the cell search information (e.g., from the first base station) to (or towards) an apparatus, where the first cell is a serving cell for the apparatus, where the cell search information enables the apparatus to measure at least one cell-specific reference signal from a second base station that services a second cell of the wireless communication network, determine if the measured cell-specific reference signal interferes with communication for the apparatus (e.g., communication between the apparatus and the first base station, for example, via the first cell), and perform interference cancellation to reduce an effect of the second cell on the communication (202).

Regarding FIG. 11, FIG. 11 is for the UE to feed back its location information, and CRS interference information back to its serving cell, and the serving cell builds a database of the location information and accompanying CRS interference information. So the next time that UE or another UE goes to that location or its proximity, then the eNB can furnish the UE with a very good startup information for CRS interference cancellation.

If a UE's speed is not too high, its location will not change much before or after a handoff. Then the information contained in the database in cell A (for instance) may be queried or fetched by cell B in the preparation of handing over the UE from cell B to cell A. The following procedure can be executed:

1. Cell B makes a determination to hand off a UE to cell A.

2. Cell B provides an indication of the UE's location to cell A via a query message.

3. Cell A looks up in its database for CRS interference information (e.g., cell search information that corresponds with certain locations) with the provided location from cell B, and responds to cell B's query with the CRS interference information. For instance, the X2 interface or a proprietary interface may be used for the transfer of the CRS interference information. The CRS interference information sent to cell B is based on the location of the UE. For instance, the look up could be based on the location of the user equipment being within some proximity from the locations in the database.

4. In the handoff message, cell B sends to the UE the CRS interference information with cell A as serving cell. The UE can then use the CRS interference information as described above.

Note the association of location and CRS interference does not depend on interference cancellation in the analog domain per se. Furthermore, the database used by cell A may also be used to provide UEs with CRS interference information at times other than handoff.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A method as in any above, further comprising one or more aspects of the exemplary embodiments of the invention as described herein.

(7) In another exemplary embodiment of the invention, a program storage device (e.g., a computer-readable medium, a non-transitory computer-readable medium, a computer-readable storage medium, a computer-readable storage device) readable by a machine (e.g., at least one apparatus, at least one processor), tangibly embodying (e.g., storing) a program of instructions executable by the machine (e.g., at least one computer program) for performing operations, said operations comprising: storing, by a first base station servicing a first cell of a wireless communication network, cell search information (201); and sending the cell search information (e.g., from the first base station) to (or towards) an apparatus, where the first cell is a serving cell for the apparatus, where the cell search information enables the apparatus to measure at least one cell-specific reference signal from a second base station that services a second cell of the wireless communication network, determine if the measured cell-specific reference signal interferes with communication for the apparatus (e.g., communication between the apparatus and the first base station, for example, via the first cell), and perform interference cancellation to reduce an effect of the second cell on the communication (202).

A program storage device as in any above, wherein the program storage device comprises at least one computer-readable medium, at least one non-transitory computer-readable medium, at least one computer-readable storage medium, at least one computer-readable memory, at least one memory, at least one memory card, at least one removable memory, at least one storage device, at least one storage component and/or at least one storage circuit. A program storage device as in any above, further comprising one or more aspects of the exemplary embodiments of the invention as described herein.

(8) In a further exemplary embodiment of the invention, an apparatus comprising: at least one processor; and at least one memory including computer program code, the at least one memory and the computer program code being configured to, with the at least one processor, cause the apparatus at least to perform: store (e.g., on a storage device or component such as at least one memory), by a first base station servicing a first cell of a wireless communication network, cell search information; and send the cell search information (e.g., from the first base station) to (or towards) another apparatus, where the first cell is a serving cell for the other apparatus, where the cell search information enables the other apparatus to measure at least one cell-specific reference signal from a second base station that services a second cell of the wireless communication network, determine if the measured cell-specific reference signal interferes with communication for the other apparatus (e.g., communication between the other apparatus and the first base station, for example, via the first cell), and perform interference cancellation to reduce an effect of the second cell on the communication.

An apparatus as in any above, where the apparatus comprises a mobile device, a mobile node, a portable device, a mobile phone or a cellular phone. An apparatus as in any above, further comprising one or more aspects of the exemplary embodiments of the invention as described herein.

(9) In another exemplary embodiment of the invention, an apparatus comprising: means for storing (e.g., at least one storage device, at least one storage component, at least one memory), by a first base station servicing a first cell of a wireless communication network, cell search information; and means for sending (e.g., at least one transmitter, at least one antenna, at least one transceiver) the cell search information (e.g., from the first base station) to (or towards) another apparatus, where the first cell is a serving cell for the other apparatus, where the cell search information enables the other apparatus to measure at least one cell-specific reference signal from a second base station that services a second cell of the wireless communication network, determine if the measured cell-specific reference signal interferes with communication for the other apparatus (e.g., communication between the other apparatus and the first base station, for example, via the first cell), and perform interference cancellation to reduce an effect of the second cell on the communication.

An apparatus as in any above, where the apparatus comprises a mobile device, a mobile node, a portable device, a mobile phone or a cellular phone. An apparatus as in any above, further comprising one or more aspects of the exemplary embodiments of the invention as described herein.

(10) In a further exemplary embodiment of the invention, an apparatus comprising: storage circuitry configured to store, by a first base station servicing a first cell of a wireless communication network, cell search information; and transmission circuitry configured to send the cell search information (e.g., from the first base station) to (or towards) another apparatus, where the first cell is a serving cell for the other apparatus, where the cell search information enables the other apparatus to measure at least one cell-specific reference signal from a second base station that services a second cell of the wireless communication network, determine if the measured cell-specific reference signal interferes with communication for the other apparatus (e.g., communication between the other apparatus and the first base station, for example, via the first cell), and perform interference cancellation to reduce an effect of the second cell on the communication.

An apparatus as in any above, where the apparatus comprises a mobile device, a mobile node, a portable device, a mobile phone or a cellular phone. An apparatus as in any above, further comprising one or more aspects of the exemplary embodiments of the invention as described herein.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device (e.g., a computer-readable medium, a memory) readable by a machine (e.g., a computer, a mobile station, a mobile device, a mobile node), tangibly embodying a program of instructions (e.g., a program, a computer program) executable by the machine for performing operations. The operations comprise steps of utilizing the exemplary embodiments or steps of the method.

The various blocks shown in FIGS. 6 and 8-11 may be viewed as method steps, as operations that result from operation of computer program code and/or as one or more coupled components (e.g., function blocks, circuits, integrated circuits, logic circuit elements) constructed to carry out the associated function(s). The blocks depicted in FIGS. 6 and 8-11 may also be considered to correspond to one or more functions and/or operations that are performed by one or more components, apparatus, processors, computer programs, circuits, integrated circuits, application-specific integrated circuits (ASICs), chips and/or function blocks. Any and/or all of the above may be implemented in any practicable arrangement or solution that enables operation in accordance with the exemplary embodiments of the invention.

Furthermore, the arrangement of the blocks shown in FIGS. 6 and 8-11 should be considered merely exemplary and non-limiting. It should be appreciated that the blocks depicted in FIGS. 6 and 8-11 may correspond to one or more functions and/or operations that may be performed in any order (e.g., any practicable, suitable and/or feasible order) and/or concurrently (e.g., as practicable, suitable and/or feasible) so as to implement one or more of the exemplary embodiments of the invention. In addition, one or more additional steps, functions and/or operations may be utilized in conjunction with those illustrated in FIGS. 6 and 8-11 so as to implement one or more further exemplary embodiments of the invention, such as those described in further detail herein.

That is, the non-limiting, exemplary embodiments of the invention shown in FIGS. 6 and 8-11 may be implemented, practiced or utilized in conjunction with one or more further aspects in any combination (e.g., any combination that is practicable, suitable and/or feasible) and are not limited only to the blocks, steps, functions and/or operations illustrated in FIGS. 6 and 8-11.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non limiting and non-exhaustive examples.

While the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems. Furthermore, while the exemplary embodiments have been described above in the context of base stations, Node Bs and evolved Node Bs (eNBs), it should be appreciated that the exemplary embodiments of this invention are not limited for use with only these types of devices/components, and they may be used to advantage with other communication devices/components, such as access nodes, Wi-Fi access nodes, home base stations, relay nodes, relay stations and ad-hoc networks, as non-limiting examples. It is briefly noted that as utilized herein the expression "e.g." means "for example" or "as one or more non-limiting examples."

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controllers, other computing devices and/or some combination thereof.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as one or more integrated circuits, where the one or more integrated circuits may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of the non-limiting and exemplary embodiments of this invention.

Furthermore, some of the features of the preferred embodiments of this invention could be used to advantage without the corresponding use of other features. As such, the foregoing description should be considered as merely illustrative of the principles, teachings and exemplary embodiments of this invention, and not in limitation thereof The following abbreviations that may be found in the specification and/or the drawing figures are defined as follows:

3GPP third generation partnership project
ABS almost blank subframe
ADC analog to digital converter/conversion
AGC automatic gain control
AP access point
BS base station
BW bandwidth
CDMA code division multiple access
CRE cell range expansion
CRS cell-specific reference signal
DCI downlink control information
DL downlink (eNB towards UE)
eICIC enhanced inter-cell interference coordination (enhanced ICIC)
eNB E-UTRAN Node B (evolved Node B)
EPC evolved packet core E-UTRAN evolved UTRAN (LTE)
FDMA frequency division multiple access
FER frame error rate
FFT fast Fourier transform
GSM global system for mobile communication
HeNB home eNB
HetNet heterogeneous network
HSPA high speed packet access
IC interference cancellation
ICIC inter-cell interference coordination
IEEE institute of electrical and electronics engineers
IMT-A international mobile telephony-advanced
ITU international telecommunication union
ITU-R ITU radiocommunication sector
LAN local area network
LTE long term evolution of UTRAN (E-UTRAN)
LTE-A LTE advanced
MAC medium access control (layer 2, L2)
MM/MME mobility management/mobility management entity
Node B base station
OFDMA orthogonal frequency division multiple access
O&M operations and maintenance
PBCH physical broadcast channel
PCFICH physical control format indicator channel
PCI physical cell identifier
PDCCH physical downlink control channel
PDCP packet data convergence protocol
PHICH physical hybrid-ARQ indicator channel
PHY physical (layer 1, L1)
RAN# technical specification group radio access network working group #
RE range extension
Rel release
RLC radio link control
RRC radio resource control
RRM radio resource management
RS reference signal
RSRP reference signal received power
S GW serving gateway
SC FDMA single carrier, frequency division multiple access
SIC successive interference cancellation
SINR signal to interference plus noise ratio
SNR signal to noise ratio
TD-SCDMA time division synchronous code division multiple access
UE user equipment, such as a mobile station, mobile node or mobile terminal
UL uplink (UE towards eNB)
UMA-LoS urban macro line of sight (channel model)
UMA-NLoS urban macro non-line of sight (channel model)
UMI-LoS urban micro line of sight (channel model)
UMI-NLoS urban micro non-line of sight (channel model)
UMTS universal mobile telecommunications system
UTRAN universal terrestrial radio access network
WAN wide area network
WCDMA wideband code division multiple access
WiMAX worldwide interoperability for microwave access (IEEE 802.16 standard)

The invention claimed is:

1. A method, comprising:
receiving, at a user equipment, a signal comprising cell-specific reference signals from a plurality of cells;
measuring by the user equipment one or more cell-specific reference signals from one of the plurality of cells to determine one or more measured results;
performing, by the user equipment and based on the one or more measured results meeting one or more first criteria, interference cancelation to cancel the one or more cell-specific reference signals corresponding to the one cell from the signal, wherein performing the interference cancelation for a selected cell comprises creating a cell-specific reference signal waveform for the selected cell, applying gain to the created cell-specific reference signal waveform to create a gain-adjusted cell-specific reference signal waveform, and adding the gain-adjusted cell-specific reference signal waveform to the received signal to create a resultant signal;
performing, by the user equipment, the measuring and the performing the interference cancelation for additional ones of the plurality of cells until one or more second criteria are met; and
using measured cell-specific reference signals having their interference canceled to reduce an effect of interference from corresponding cells on communications between a user equipment and a base station, wherein the using comprises performing analog to digital conversion on the resultant signal.

2. The method of claim 1, further comprising receiving cell search information and using the cell search information for the measuring the one or more first cell-specific reference signals.

3. The method of claim 2, wherein receiving search information further comprises receiving the cell search information from the base station, wherein the base station services a first cell of the plurality of cells, and wherein the first cell is a serving cell for the user equipment.

4. The method of claim 2, wherein the cell search information comprises cell identifications, timing information, and cyclic prefixes for at least some of the plurality of cells.

5. The method of claim 2, further comprising creating by the user equipment a database of information corresponding to the cell-specific reference signals for at least some of the plurality of cells and location information for the some of the plurality of cells.

6. The method of claim 5, further comprising using the database to determine which cells at a location are cells creating interference for a communication between the user equipment and a base station providing access by the user equipment to a wireless network, and using the cells creating interference from the database to select cells for performing the measuring and the performing interference cancelation.

7. The method of claim 2, where the measuring and performing are performed for a second base station serving a second cell, and wherein the interference cancellation is performed in response to determining by the user equipment that a cell-specific reference signal of the second of the plurality of cells interferes with a communication that occurs between the user equipment and the base station.

8. The method of claim 7, wherein performing the measuring and the performing the interference cancelation for additional ones of the plurality of cells until one or more second criteria are met further comprises:
measuring one or more cell-specific reference signals from a third base station servicing a third cell, where a first coverage of the first cell at least partially overlaps a third coverage of the third cell; and
performing, responsive to the one or more measured results from the third cell meeting one or more first criteria, interference cancellation to reduce an effect of the third cell on communications that occur between the user equipment and the first cell.

9. The method as in claim 1, wherein performing the measuring and performing interference cancelation is performed for the additional cells having a coverage that at least partially overlaps with a first coverage of a first cell formed by a base station, where the first cell is a serving cell for the user equipment.

10. The method of claim 1, wherein the one or more first criteria comprise one of a level of interference, a specified signal to noise ratio, or a signal to interference plus noise ratio.

11. The method of claim 1, wherein the one or more second criteria comprise one of: a channel estimate for a selected cell is not accurate enough based on an estimated signal to noise ratio or signal to interference plus noise ratio; a certain number of interfering signals have been canceled; or an estimated quality of a signal received from a base station providing access by the user equipment to a wireless network meets a condition.

12. The method of claim 11, wherein the estimated quality of the signal received from a current access base station is determined to meet the condition in response to the received signal being determined to be good enough based on an estimated signal to interference plus noise ratio, or in response to enough interference has been canceled such that a noise level is within an acceptable range.

13. The method of claim 1, further comprising performing one or more cell-specific reference signal measurements for cells deemed to be interfering during measurement opportunities via which the user equipment has access to a wireless network, wherein the user equipment adjusts gain control using the one or more cell-specific reference signal measurements, and uses the adjusted gain control for performing the interference cancelation.

14. The method of claim 1, further comprising:
creating the cell-specific reference signal waveform using at least a cell identification of the selected cell.

15. The method of claim 14, further comprising:
creating the cell-specific reference signal waveform using at least a slot number index corresponding to the selected cell.

16. An apparatus, comprising:
at least one memory including computer program code;
at least one processor,
the one or more memories and the computer program code configured, with the one or more processors, to cause the apparatus to perform at least the following:
receiving, at a user equipment, a signal comprising cell-specific reference signals from a plurality of cells;
measuring by the user equipment one or more cell-specific reference signals from one of the plurality of cells to determine one or more measured results;
performing, by the user equipment and based on the one or more measured results meeting one or more first criteria, interference cancelation to cancel the one or more cell-specific reference signals corresponding to the one cell from the signal, wherein performing the interference cancelation for a selected cell comprises creating a cell-specific reference signal waveform for the selected cell, applying gain to the created cell-specific reference signal waveform to create a gain-adjusted cell-specific reference signal waveform, and adding the gain-adjusted cell-specific reference signal waveform to the received signal to create a resultant signal;

performing, by the user equipment, the measuring and the performing the interference cancelation for additional ones of the plurality of cells until one or more second criteria are met; and
using measured cell-specific reference signals having their interference canceled to reduce an effect of interference from corresponding cells on communications between a user equipment and a base station, wherein the using comprises performing analog to digital conversion on the resultant signal.

17. The apparatus of claim 16, wherein the one or more memories and the computer program code are further configured, with the one or more processors, to cause the apparatus to perform at least the following:
receiving cell search information and means for using the cell search information for the measuring the one or more first cell-specific reference signals.

18. The apparatus of claim 17, wherein receiving search information further comprises receiving the cell search information from the base station, wherein the base station services a first cell of the plurality of cells, and wherein the first cell is a serving cell for the user equipment.

19. The apparatus of claim 17, wherein the cell search information comprises cell identifications, timing information, and cyclic prefixes for at least some of the plurality of cells.

20. The apparatus of claim 17, wherein the one or more memories and the computer program code are further configured, with the one or more processors, to cause the apparatus to perform at least the following: creating by the user equipment a database of information corresponding to the cell-specific reference signals for at least some of the plurality of cells and location information for the some of the plurality of cells.

21. The apparatus of claim 20, wherein the one or more memories and the computer program code are further configured, with the one or more processors, to cause the apparatus to perform at least the following: using the database to determine which cells at a location are cells creating interference for a communication between the user equipment and a base station providing access by the user equipment to a wireless network, and using the cells creating interference from the database to select cells for performing the measuring and the performing interference cancelation.

22. The apparatus of claim 17, where the measuring and performing are performed for a second base station serving a second cell, and wherein the interference cancellation is performed in response to determining by the user equipment that a cell-specific reference signal of the second of the plurality of cells interferes with a communication that occurs between the user equipment and the base station.

23. The apparatus of claim 22, wherein he performing the measuring and the performing the interference cancelation for additional ones of the plurality of cells until one or more second criteria are met further comprises:
measuring one or more cell-specific reference signals from a third base station servicing a third cell, where a first coverage of the first cell at least partially overlaps a third coverage of the third cell; and
performing, responsive to the one or more measured results from the third cell meeting one or more first criteria, interference cancellation to reduce an effect of the third cell on communications that occur between the user equipment and the first cell.

24. The apparatus as in claim 16, wherein the performing the measuring and performing interference cancelation is performed for the additional cells having a coverage that at least partially overlaps with a first coverage of a first cell formed by a base station, where the first cell is a serving cell for the user equipment.

25. The apparatus of claim 16, wherein the one or more first criteria comprise one of a level of interference, a specified signal to noise ratio, or a signal to interference plus noise ratio.

26. The apparatus of claim 16, wherein the one or more second criteria comprise one of: a channel estimate for a selected cell is not accurate enough based on an estimated signal to noise ratio or signal to interference plus noise ratio; a certain number of interfering signals have been canceled; or an estimated quality of a signal received from a base station providing access by the user equipment to a wireless network meets a condition.

27. The apparatus of claim 26, wherein the estimated quality of the signal received from a current access base station is determined to meet the condition in response to the received signal being determined to be good enough based on an estimated signal to interference plus noise ratio, or in response to enough interference has been canceled such that a noise level is within an acceptable range.

28. The apparatus of claim 16, wherein the one or more memories and the computer program code are further configured, with the one or more processors, to cause the apparatus to perform at least the following:
performing one or more cell-specific reference signal measurements for cells deemed to be interfering during measurement opportunities, via which the user equipment has access to a wireless network, wherein the user equipment adjusts gain control using the one or more cell-specific reference signal measurements, and uses the adjusted gain control for performing the interference cancelation.

29. The apparatus of claim 16, wherein the one or more memories and the computer program code are further configured, with the one or more processors, to cause the apparatus to perform at least the following:
creating the cell-specific reference signal waveform using at least a cell identification of the selected cell.

30. The apparatus of claim 29, wherein the one or more memories and the computer program code are further configured, with the one or more processors, to cause the apparatus to perform at least the following:
creating the cell-specific reference signal waveform further using at least a slot number index corresponding to the selected cell.

* * * * *